(12) United States Patent
Swanson et al.

(10) Patent No.: US 8,319,816 B1
(45) Date of Patent: Nov. 27, 2012

(54) METHODS, SYSTEMS AND PROGRAM PRODUCTS FOR EFFICIENT COMMUNICATION OF DATA BETWEEN CONFERENCE SERVERS

(75) Inventors: Jon N. Swanson, Queensbury, NY (US); Adam Chapweske, Minneapolis, MN (US); Andrija Colovic, Chicago, IL (US); Jonathan Arnold, Medford, MA (US)

(73) Assignee: Insors Integrated Communications, Chicago, IL (US)

( * ) Notice: Subject to any disclaimer, the term of this patent is extended or adjusted under 35 U.S.C. 154(b) by 647 days.

(21) Appl. No.: 12/510,860

(22) Filed: Jul. 28, 2009

(51) Int. Cl.
*H04M 11/00* (2006.01)

(52) U.S. Cl. ..................... 348/14.01; 370/352

(58) Field of Classification Search .... 348/14.01–14.08, 348/14.09
See application file for complete search history.

(56) References Cited

U.S. PATENT DOCUMENTS

| | | | | |
|---|---|---|---|---|
| 7,512,692 | B2 * | 3/2009 | Minborg et al. | 709/227 |
| 7,764,641 | B2 * | 7/2010 | Pelton et al. | 370/328 |
| 2005/0007446 | A1 * | 1/2005 | Schrader et al. | 348/14.09 |
| 2007/0285501 | A1 * | 12/2007 | Yim | 348/14.08 |
| 2011/0085019 | A1 * | 4/2011 | Li et al. | 348/14.09 |

OTHER PUBLICATIONS

Cisco, "Multipoint Solution for Cisco TelePresence Systems," Believed to have been published circa Jan. 1, 2010, pp. 1-13, Published at http://www.cisco.com/en/US/prod/collateral/ps7060/ps8329/ps8331/ps7315/white_paper_c11-610159.html.

Michael G. Andreu et al., "Ten Tips for Organizing a Videoconference at Multiple Sites Using the Polycom System[1]," Feb. 1, 2011, pp. 1-4, Published at http://edis.ifas.ufl.edu/pdffiles/FR/FR17700.pdf.

Cisco, "Cisco and Microsoft Collaboration in Unified Communications," Feb. 1, 2011, pp. 1-27, Published at http://www.cisco.com/en/US/prod/collateral/voicesw/ps6788/vcallcon/ps556/prod_white_paper0900aecd805e90_ns165_Networking_Solutions_White_Paper.html.

Cisco Webex, "Unleashing the power of real-time collaboration: Security overview of Cisco WebEx solutions," Believed to have been published circa Jan. 1, 2009, pp. 1-12, Published at http://www.cisco.com/en/US/prod/collateral/ps10352/cisco_webex_security_overview.pdf.

Microsoft Corporation, "Microsoft Office Communications Server 2007," Believed to have been published circa Jan. 1, 2007, pp. 1-87, Published at http://www.microsoft.com/uc/products/ocs2007.mspx.

Forrester Research Inc., "The Total Economic Impact of Microsoft Lync Server 2010," Nov. 1, 2010, pp. 1-38.

(Continued)

*Primary Examiner* — Curtis Kuntz
*Assistant Examiner* — Maria El-Zoobi
(74) *Attorney, Agent, or Firm* — Greer, Burns & Crain, Ltd.

(57) ABSTRACT

One embodiment of the invention is a videoconference system in which multiple users communicate video and audio data to one another over a data network. The example system comprises a first conference server linking a plurality of first users to one another to allow each of the first users to communicate at least one video data stream and at least one audio data stream to others of the first users whereby the first users are in real-time two way audio and video communication with one another. The example system further comprises a second conference server linking a plurality of second users to one another to allow each of the second users to communicate at least one video data stream and at least one audio data stream to others of the second users whereby the second users are in real-time two way audio and video communication with one another.

18 Claims, 8 Drawing Sheets

OTHER PUBLICATIONS

Polycom, "The Polycom Open Collaboration Network," Believed to have been published circa Jan. 1, 2011, Published at http://www.polycom.com/company/features/open_collaboration_network.html.

J. Rosenburg, H. Schulzrinne et al., "SIP: Session Initiation Protocol," Jun. 1, 2002. pp. 1-269.

* cited by examiner

METHODS, SYSTEMS AND PROGRAM PRODUCTS FOR EFFICIENT COMMUNICATION OF DATA BETWEEN CONFERENCE SERVERS

FIELD

A field of the invention is videoconferences. Additional fields include methods, systems and program products for managing communication of data during a collaboration event such as a videoconference, and for linking users from different conference servers to one another.

BACKGROUND

Collaboration events such as videoconferences can occur over a data network (such as, for example, the Internet, wide area networks or local area networks). During some such events, multiple users may be sharing video, audio and other data with multiple other users. Videoconferences are typically conducted over a conference server or bridge. All attendees connect to the server, and the server routes audio and video data between the users. Depending on the scale of the event, very large amounts of data may be shared. This can strain network and participant resources. Also, the large number of streams being communicated can complicate the event and make it difficult for users to effectively communicate with one another. These and other problems may be particularly acute when conferences involve users that are locally connected to different conference servers.

SUMMARY

One embodiment of the invention is a videoconference system in which multiple users communicate video and audio data to one another over a data network. The example system comprises a first conference server linking a plurality of first users to one another to allow each of the plurality of first users to communicate at least one video data stream and at least one audio data stream to others of the first users whereby the first users are in real-time two way audio and video communication with one another. The example system further comprises a second conference server linking a plurality of second users to one another to allow each of the plurality of second users to communicate at least one video data stream and at least one audio data stream to others of the second users whereby the second users are in real-time two way audio and video communication with one another. The second conference server is geographically remote from the first conference server. The example system further comprises a high bandwidth communications link connecting the first conference server to the second conference server that exists before, during and after individual videoconferences, the first conference server configured to communicate a first video data stream originating from at least one of the first users to the remote second conference server over the high bandwidth link, the second conference server configured to receive the first video data stream and to communicate it to at least one of the second users.

An additional example embodiment of the invention is a computer program product for managing streaming data communication between different servers during a videoconference, the program product comprising executable instructions stored on a tangible medium, the instructions when executed causing first and second video conference servers to perform steps comprising the first conference server to receive a request from a locally connected first user to participate in a videoconference with at least second and third users that are connected to a remote server that is linked to the first server by a high bandwidth communications link that already exists; the second conference server to connect to the first conference server using the high bandwidth communications link as a client on behalf of the second and third users; the first conference server to receive a first user video data stream from the first user and to communicate it to the second conference server using the high bandwidth communications link; the second conference server to receive the first user video data stream, to copy it, and to communicate one copy of the first user video data stream to each of the second and third users; the second conference server to receive a second user video data stream from the second user and to communicate it to the first conference server using the high bandwidth link; the second conference server to receive a third user video data stream from the third user and to communicate it to the first conference server using the high bandwidth link; and, the first conference server to receive each of the second user video data stream and the third user video data stream from the second conference server and to communicate both of the second and third user video data streams to the first user, wherein each of the first, second and third users are in real-time streaming video communication with one another.

Still another example embodiment of the invention is a method for communicating streaming video data during a videoconference between users that are locally connected to different conference servers. The example method comprises the steps of a first camera at a first user to transform input into video data, a first computer at the first user to transform the video data from the camera into a first video data stream and to communicate the video data stream to a first conference server. The first conference server then communicates a single copy of the first video data stream to a remote second conference server in unicast using a high bandwidth high bandwidth link that exists between the first and second conference servers and that is used for all video data communications between the first and second conference servers during all videoconferences that the first and second conference servers communicate during. The remote second conference server then receives the single copy of the first video data stream and communicate in unicast one copy of the first video data stream to each of a plurality of locally connected second users; and, the first conference server to repeatedly report presence data to the second conference server before, during and after individual videoconferences, the reported presence data indicating which first users are locally connected to the first conference server and available for conferencing, and the second conference server to communicate the presence data to locally connected second users whereby the locally connected second users have a current list of first users that are available for conferencing.

Other examples of the invention and further details of embodiments are described below.

DETAILED DESCRIPTION OF EMBODIMENTS

Figure 1:
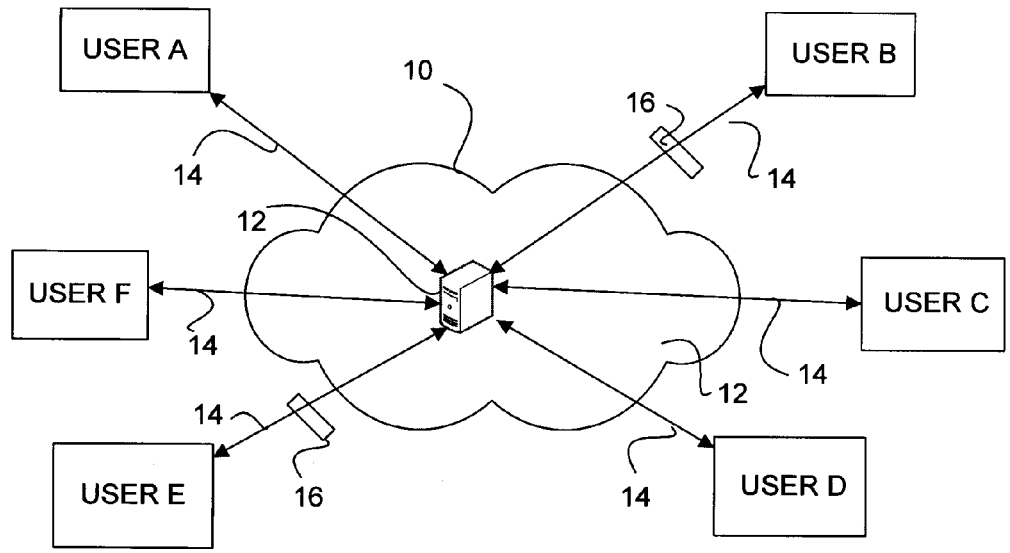
FIG. 1 is a schematic of a network useful to illustrate practice of some embodiments.

One example embodiment of the invention includes two or more videoconference servers that are geographically remote from one another and that each have a plurality of locally connected users. In many (but not all) invention embodiments the remote servers are federated with one another. Those knowledgeable in the art will appreciate that federated servers are connected to one another and in many aspects operate and may be treated as a single server. Two federated remote servers in some invention embodiments may therefore be treated and operate as a single server from the perspective of any of the users locally connected to either of the remote servers. The remote conference servers are connected to one another using a high bandwidth connection, such as a trunk connection, that allows for high speed, low latency, and reliable communication of data streams during video conferences between users locally connected to the two different servers.

The first and second federated conference servers share user presence data across the high bandwidth connection before, during and after videoconferences so that the locally connected users at different remote servers enjoy global presence data. They have data indicating which other users are currently available for conferencing, regardless of what conference server those users are locally connected to.

In another aspect of some invention embodiments, one of the federated conference servers is connected (using the high bandwidth connection) to the other as a client on behalf of its locally connected users. This can result in significant efficiency gains in communications. As an example, a second remote server that connects as a client to a first remote server may be communicated only a single version of a data stream and then make copies of it for distribution to the plurality of locally connected users. Only a single version of the data stream therefore makes the "long hop" between the first and second remote servers.

Before discussing particular features of example embodiments in detail, it will be appreciated that the present invention may be embodied in a method, system, and/or computer program product, including but not limited to videoconference methods, videoconference systems and videoconference program products. For example, a method according to one embodiment may be carried out by one or more users using computers or by one or more computers executing steps of the invention, and a program product of the invention may include computer executable instructions stored on a tangible memory medium (that may be, for example, a magnetic or optical disk or other magnetic or optical media, electrical, chemical, electrochemical, or other tangible media) that when executed by one or more computers cause one or more computers to carry out steps of a method of the invention. The program instructions and methods of embodiments of the invention transform data, cause results of computations and/or data to be stored in one or more memories and/or to be displayed on displays, with such storage and/or display causing a transformation of physical elements such as a physical alteration to a memory media that may be read to recover the stored data. Further, one or more computer(s) or other processor based devices in combination with connected hardware such as one or more of cameras, microphones, monitors, projectors, and the like that are carrying out steps of a method of the invention and/or that are running a program product of the invention embody a system of the invention.

It will therefore be understood that in describing a particular embodiment of the present invention, be it a method, system or program product, descriptions of other embodiments may also be made. For example, it will be understood that when describing a method of the invention, a system and/or a program product of the system may likewise be described, and vice-versa.

Turning now to the drawings, FIG. 1 is a schematic of a network 10 that is useful to describe example methods, program products and systems of the invention. The network shown as cloud 10 includes one or more computers 12 that link Users A-F to one another for conducting videoconferences. The term computer as used herein is intended to be broadly interpreted as at least one electronic device that accepts, processes, stores (at least temporarily), and outputs data according to programmed instructions. Thus, a computer can include, by way of example and not by way of limitation, a laptop computer, mainframe computer, cell phone, personal digital assistant, and processor-based controller on a machine. The computer 12 may also comprise one or more components for linking communications between users. It may include, for example, one or more processor based devices linked to one another for communications and each having a plurality of communication ports, a software component running on one or more memories that facilitate communications, a networking card(s), a modem(s), and the like.

The computer 12 can be referred to in the video/audio conferencing and networking arts as a conference server, bridge (or as containing a bridge), or the like which can be, for example, a software component running on a server or router that controls one or more ports for interconnecting the Users A-F. As used herein the term port is intended to be broadly interpreted as a physical or logical destination and/or origination point for digital communications. Examples of ports include but are not limited to, network cards, an IP address, a TCP or UDP port number, and the like. A bridge may also comprise software useful to, for example, specific one or more ports for communication between those users. In many embodiments all users A-F are connected to one another using a single bridge or conference server 12.

In some applications, a group of individual servers 12 may be linked to one another for collectively carrying out the functionality of a server 12. In such instances the group of individual servers are viewed, for practical purposes, by the outside world or network components as being a single server 12. Upstream and downstream components essentially treat the group as being a single server, and the group of servers perform as if they were a single server. For purposes of description of the present invention, it will therefore be appreciated that the server 12 may be a group of linked servers that act as a single server.

The conference server 12 may be located on a company premises, with an example being at an office where the end users A-F reside. In other applications some or all of the users A-F may be external from the location where the conference server 12 is. Some or all of users A-F may be, for example, branch offices, home-based workers or traveling employees that connect to the server 12. In still other applications, the conference server 12 may be located at a commercial communications service provider such as a telephone, broadband, or internet service provider data center, with users A-F located at one or more offices and establishing connections 14 to the conference server 14 using the internet.

The network 10 may be all or part of a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may be the Internet, a private network, a public network, a virtual private network, Local Area Network (LAN), all or part of a Wide Area Network (WAN), all or part of a Metropolitan Area Network (MAN).

The network 10 may also be a successor to the current Internet (such as, for example, the Fast Internet, or Grid, currently under development by the European Centre for Nuclear Research (CERN) based in Geneva, Switzerland). The CERN Fast Internet is expected by some to transmit data orders of magnitude faster than what is currently understood to be broadband speed. The Fast Internet and each other successors to the Internet are referred to herein simply as fast versions of the Internet.

The protocol between the computer 12 and the Users A-F may be that of a server and client. The server client relationship between the computer 12 and the Users A-F may be reversed on occasion, wherein for some tasks the computer 12 is the client and the User A-F the server, and vice-versa for other tasks.

The network 10 may be useful for a number of data communication purposes. In an example application, the network 10 is useful to facilitate a real-time communications session, such as a videoconference, between one or more of the Users A-F. Examples of a videoconference include two or more of the Users A-F communicate streaming video and/or audio communications in real-time with one another, whereby all participating users can see and hear all other users in substantially real time.

As used herein the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal delay or such that the delay is not obtrusive with respect to a particular application. As an example, delay of less than several seconds, or less than 1.0 or 0.25 second, or another, similar time between an event and a communications of such event to another computer user may be considered live for the purposes of the present system.

In a videoconference, for example, multiple participants may be sending and receiving live real-time video and audio data to one another—each is talking to one or more of the others in real-time with delay at a suitably minimal level so that "conversations" between users over the network can take place in real-time. It will therefore be appreciated that the terms, "live" or "real-time" when used in this context is not limited to zero delay, but instead that some minimal delay is allowed for which may be for example of the order of several seconds. The delay should not be so great as to cause difficulties in different users communicating with one another—delays greater than about 5 seconds may be unsuitable in many applications.

In many videoconference or other real-time collaboration events, all of users A-F may see and hear all others of users A-F in real-time by simultaneously communicating audio and video data streams to all others of the users A-F. Communications between each of the users A-F may be carried out on a two-way basis from the network 10, with data sent to and received from each of the Users A-F over the communications lines 14. These may comprise physically wired connections such as copper wires, optical fiber cables, or the like; or may be wireless connections. Real-time video, audio, and other data may be communicated from each of the users A-F to all others of the users A-F through the server 12 and over the communications lines 14.

A firewall 16 or other security device may isolate the users A-F from the network 10. The firewall 16 has been illustrated in FIG. 1 as located on the communications link 14. This has been done for illustration only—one or more firewalls 16 may be at any desired location useful to monitor and control access of traffic between a user A-F and the network 10.

Those knowledgeable in the art will appreciate that communications over the network 10 between the users A-F may be carried out in any of a number of generally known procedures. For example, known methods of one or more of uni-, multi-, or broadcast may be used. Also, the data may be streaming. In a streaming video communications session application, each user A-F may have one or more cameras, telephones and/or microphones from each of which is streamed a continuous, real-time data on a particular unicast or multicast address and port number. As used herein the term continuous data stream is intended to broadly refer to a data stream sent in substantially continuous succession, although some degree of intermittency is contemplated.

For example, a packetized data stream in IP may be continuous and streaming even though there may actually be some minimal delay between discrete packets. Different protocol communications may be supported by the network 10 and the users A-F, including but not limited to ITU H.320, ITU H.323, ITU H.324, SIP (session initiation protocol), RTP (real time protocol), RTSP (real time streaming protocol), RTTP (real time transport protocol), HTTP (hyper text transfer protocol) and other suitable protocol for initiating and communicating real time and streaming data. It will be appreciated that when used in this context, the term "communicated" is intended to be broadly interpreted and does not require direct communication. For example, a first user A may communicate data to a second user B, even though the data passes through a number of intermediate nodes between origination and final destination.

Figure 2:
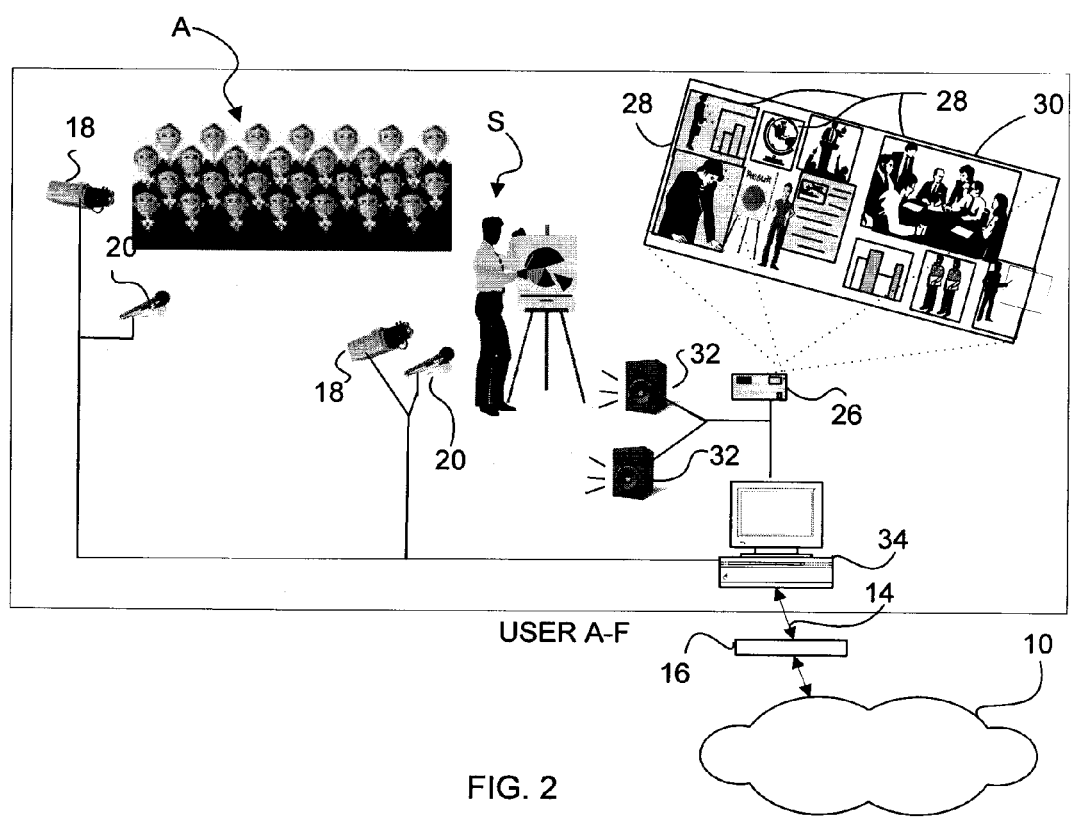
FIG. 2 is a schematic of one example video conference attendee room useful to illustrate practice of some embodiments.
Figure 3:
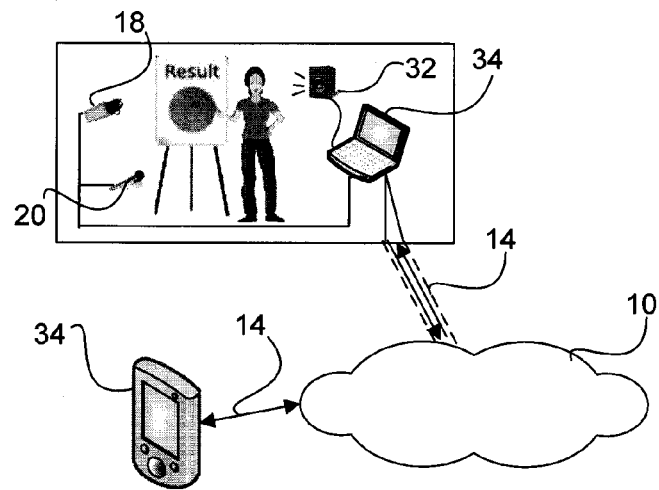
FIG. 3 is a schematic of a second example video conference attendee room as well as a handheld computer useful to illustrate practice of some embodiments.

Communications of the streaming data between users A-F may be further appreciated through consideration of FIGS. 2-3 that schematically show some representative configurations of the users A-F. As shown by FIGS. 2-3, the users A-F may be conference rooms, class rooms, or other spaces in which one or multiple individuals gather to participate in the video communications session with other individuals that are located at others of the users A-F. Each user A-F may have one or more cameras, microphones, speakers, video screens, and other devices for communicating audio and video data.

With reference to FIG. 2, cameras 18 at one user A-F may be trained on different people or things at that location, with an example being one camera 18 at an audience A and one camera 18 at a speaker S. The cameras may be controllable remotely, so that user A may be able to direct the direction of a camera 18 at user B, for instance. At other locations, with examples shown in FIG. 3, only one camera 18 is present. Many different cameras will be appropriate for practice of example embodiments, with suitable examples including those available from LOGITECH Co., Fremont Calif. (e.g., Logitech QuickCam Pro 4000), the MICROSOFT LifeCam VX-1000, the SONY EVI D100 series and/or the CANON VC series of remote pan/tilt cameras, and the like. Also, many communication devices are commercially available with built in cameras, including laptop computers, smartphones, and the like.

In FIG. 2, two microphones 20 are provided—one for receiving audio from the instructor S and a second for receiving audio from the audience A. There are a wide variety of suitable microphones available for practice of embodiments of the system, including by way of example SONY ECM microphones, PHOENIX Duet microphone, POLYCOM microphones, and the like. Although not illustrated, those knowledgeable in the art will appreciate that other cameras, microphones, computers, gateways, firewalls, mixers, multiplexers, and like devices may also be present depending on desired video communications session details and other factors. Several microphones 20 may be desirable, for instance, to surround the audience A or speaker S to ensure accurate pick-up of audio. A mixer board may be provided for mixing of audio and/or video signals. These elements may be parts of system embodiments of the invention.

FIG. 3 illustrates an alternate configuration in which a single individual is participating in the conference at one of the locations user A-F. In FIG. 3, only a single camera 18 is provided and a single microphone 20 along with a laptop computer 34. This could represent, for instance, a business person participating from a hotel room, train or plane while traveling. Other participants may be located, for example, in a vehicle (such as an auto, truck, train, plane, boat, etc.), a home office, or other location. The camera 18 (such as a LOGITECH QuickCam), microphone 20 and speaker 32 might be combined with a laptop, or the microphone 20 and speaker 32 might be contained in headphones worn by the user. Suitable headphones include those available from PLANTRONICS Corp. This example configuration is particularly convenient for portable participation in video communications sessions.

FIG. 3 also illustrates a second computer 34 in the form of a portable handheld device (shown in enlarged scale relative to laptop 34 for clarity) that may be used to participate in a videoconference. Computer 34 may be a handheld computer, a cellular or other portable phone equipped with a small monitor, a smartphone, a handheld entertainment device, or the like that is capable of communicating with the network 10. Examples of computer 34 include the IPHONE from Apple Computer Corp. (Cuppertino, Calif.), a BLACKBERRY brand phone from Research in Motion, Corp., a SONY VAIO handheld micro PC (such as model number VGN-UX180) from Sony Corp., an IPAQ Smartphone from Hewlett-Packard Corp. (California) (such as model HP iPAQ 910c), or the like. Such devices may have a camera and microphone built-in, or may have these added as peripheral devices connected thereto.

In an example video communications session such as a videoconference, each of the users A-F not only sends streaming video and audio data, but likewise receives streaming video, audio, and other data communicated from some or all of the other users A-F. In many applications it is desirable to have all users send and receive streaming audio and video data to all others of the users whereby each user can see and hear all other users simultaneously. Referring once again to the schematics of FIG. 2 by way of example, one or more projectors 26 may be provided to project real-time video images 28 from one or more of the other Users A-F on a screen 30.

There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being having at least 2000 lumens and XGA resolution. Also, it will be appreciated that use of a projector to display output images may easily be replaced with use of a monitor on which output video images are viewed. For example, FIG. 3 illustrates a laptop computer 34 and a handheld smartphone which each have an integral monitor which can be used to display output video data streams 28 from others of the users A-F.

Other larger size monitors may also be useful for display of video data, with examples including standard cathode ray tube monitors, 19", 40", 50" and larger plasma, LCD and other technology monitors. One or more speakers 32 may also be provided to play real-time audio from the other users or other sources.

Any number of video images may be provided that show video data in real-time from any number of other cameras or other sources located at the other users. For example, the user A may simultaneously display output video data streams 28 from each of the other users B-F, or may choose to display on a select subset of those streams. The display of streams may be set as desired, with different output display streams 28 located in different locations on the display 30. Further, the output video streams 28 may include charts, graphs, documents, other digital files, replayed video files, and the like. In many embodiments of the invention, users may select which video, audio and application data to view so that a highly customizable conference experience is provided for each user.

Digital documents such as charts, word processor documents, spreadsheets and the like may be input to any of the computers 34 at any of the users A-F for display at all or some of the other users' locations. Likewise, digital images, including stored video streams and digital documents, for instance, may be stored in a memory accessible over the network 10 for replaying during the video communications session at any or all of the Users A-F. Output video streams 28 may be manipulated as desired, with examples of manipulation including moving the images, resizing the images, and the like.

A particular example of a data file in addition to audio and video data includes shared files (sometime referred to as documents) having text, images, numerical values, and the like. For example, within a videoconference or virtual meeting different of the users A-F at different locations may desire to all work on a single document. In such circumstances, the single document may be described by a shared file stored on the network and which can be modified by any of the users A-F. Each user A-F receives continuous updates of the document so they are aware in close to or at real-time of modifications and the current state of the document.

A variety of other shared files may be useful in conducting collaboration events within practice of the system. It may be useful, for example, for each of the users A-F to know in or close to real-time which other users are connected to the network 10 and available for conferencing. This can be accomplished through the server running a user presence application and maintaining a shared user presence file on the network 10 that is regularly updated to reflect currently available users A-F.

Presence data may indicate which of users A-F are currently logged in, registered or otherwise connected to the conference server 12 and are available for conferencing. Presence data may further include information such as current status ("available," "busy—in another conference," "do not disturb," "currently conferencing in meeting no. 1234 with users 1, 13, and 17 . . . ", etc.). Users A-F also receive regular updates of the user presence data to ensure it is current. There may also be shared files maintained on the network 10 that list the current status of hardware at each of the users A-F (e.g., which of cameras 18 and microphones 20 are on, what their settings are, etc.), chat applications, and others.

Embodiments of the invention may include other users (not shown) that participate in a videoconference but that do not communicate both audio and video (or other types of) data. An example includes a conference attendee (not shown) that participates over a phone together with users A-F via audio data only. Accordingly a videoconference carried out according to systems and methods of the invention may include a plurality of users (such as A-F) that each communicate audio and video data to each other, as well as an additional user(s) (not shown) that participate by audio only (or video only, or some other limited set of data communication), with an example being a phone participant utilizing audio data only.

The one or more computers 34 at each of the users A-F may be used to receive and send all of the video, audio, documents, digital files and other data at the standard user A. The computer 34 may be referred to as a client computer or client, although as noted above it may also function at times as a server with the computer 12 being a client. A variety of computers that are currently commercially available will be suitable for use as computer 34, with examples including the Dell Precision 470 with dual processors and the HP Workstation XW6000 dual processor.

As with the computer 12, the computer 34 is intended to be broadly interpreted and is not limited to a single, desktop type computer as illustrated. Other devices that include a processor capable of executing instructions may be used, although they may sometimes be referred to as a device other than a "computer." Examples include other devices described above with reference to the laptop and handheld computers 34 illustrated in FIG. 3. Accordingly, the term "computer" as used herein with reference to computer 34 (and computer/server 12) is intended to be broadly interpreted. Further, the computer 34 may be comprised of two or more computers linked to one another.

An application program, including one or more codecs, may be running on the computer 34 to transform input or output video or audio data, to provide signal coding/decoding, compression/decompression, to coordinate receiving and sending of the data streams, and to control other aspects of sending and receiving of the data streams. For example, the computer 34 may be used to control which or how many video images 28 are displayed on the screen 30, to size the images 28, to set audio levels for the speakers 32, and the like. Each computer 34 may be running a video codec, an audio codec, other codecs, one or more application programs, and other programs. These may be combined into a single application program or may be separate from one another. The computer 34 may also have video and audio capture cards, with an example being WEBCAM Corp. 4 input video capture card.

According to the configurations of FIGS. 1-3, a videoconference or other virtual meeting can occur between two or more of the users A-F. The users A-F may virtually "attend" an immersive and extensive virtual meeting that includes audio, video and/or other streaming data shared in real-time. Participants at each of the users A-F may simultaneously hear and/or view data from all others of the users A-F. Or, in some embodiments, one or more users may receive an abbreviated set of streaming data. As an example, the laptop 34 and handheld computer 34 illustrated in FIG. 3 may receive only one, two or three selected video streams. This may be desirable, for instance, to suit the relatively small screen of the handheld computer 34.

One or more users A-F may collaboratively work on one or more shared documents held on the network 10 with each receiving regular updates of modifications made by others. Such meetings may be desirable for corporations, universities, government, and other groups of people located remotely from one another that find it useful to interact in an environment that allows a greater level of intimacy than an audio-only phone call or a single image video conference.

During the carrying out of a collaboration session such as a videoconference of the invention, data may be converted, transformed, stored in tangible memory media, and displayed using monitors. As an example, sound waves are received by microphones 20 and light by cameras 18 and converted to representative analog and/or digital data. This data may be communicated by computers 34 and 12, stored in tangible memory media such as magnetic, optical, chemical or electrical media on the network 10 and/or locally. Such storage may result in physical changes to the memory media. The data may also be transformed or otherwise physically changed for output. As an example, video stream data is ultimately displayed using a monitor or projector, and audio stream data is converted to power signals for causing speakers to output corresponding sound waves.

Applications for use of video communications sessions of the present system include, but are not limited to, distance learning, medical consultation, business meetings, industry collaboration, social interaction, government or university collaborative research, entertainment, gaming, financial market trading, and the like. In a distance learning application, a professor at one site (e.g., user A) may be able to take questions from students located at many additional sites (e.g., users B-F), which can be locally located (e.g., different rooms or buildings in same campus) or very far from one another (e.g., different cities, states or countries).

In some communications sessions of the system, each of the sites can view and hear all of the other sites. In a medical consultation application, doctor specialists from around the country can participate in the diagnosis of a particular case. X-rays can be viewed by all, and each doctor at each location can discuss the case with all of the other participating doctors. In an industrial collaboration application, remotely located engineering, marketing, management, and labor teams may all discuss development of a new product. Each site may ask questions of any other site, and each site may submit documents and charts covering aspects of the project for which they are responsible.

Referring once again to FIG. 1, when a collaborative communications session such as a videoconference occurs between the users A-F, multiple video, audio and other data streams may be communicated between the various users and over the conference server 12. A rich, immersive, and extensive virtual meeting environment may be provided that includes video, audio, and other streaming data shared in real-time between multiple participants at multiple locations. Participants at each of the users A-F may simultaneously communicate audio and video data to all others of the users A-F whereby each user can simultaneously see and hear all other users. Such meetings may be desirable for corporations, universities, government, and other organizations that have groups of people located remotely from one another that need to interact in a somewhat detailed manner.

When conducting such virtual meetings, relatively large amounts of communication bandwidth may be required. Referring to the examples of FIGS. 1 and 2, in some embodiments each of the several cameras and microphones at each of the users A-F may be sent as a streaming real-time data stream to each of the other users A-F. In this manner, each user A-F receives multiple streams from all other users A-F. By way of illustration, Table 1 summarizes the data communicated over each link 14 in one example application:

|  | Outgoing Data Streams: | Incoming Data Streams: |
|---|---|---|
| Users A-F | 2 Cameras,<br>2 Microphones,<br>1 application =<br><br>5 total | 25 streams<br>(5 each from Users B-F) |

As a result, in an example meeting occurring according to the configuration of FIGS. 1-2 wherein each of the users A-F are meeting with one another, each user A-F is simultaneously streaming five discrete data streams out across the communication line 14 while also simultaneously receiving 25 discrete data streams (five from each of the five other users) across the line 14. Link 14 may therefore be required to carry 30 real time streams. The bandwidth required for each of the communications lines 14 can therefore be substantial. In some configurations, all of the audio streams from each site may be bundled together for convenience. For example, data streams A4 and A5 (MIC 1 and 2) may be bundled into a single stream. Bundling of video streams is also possible in some invention embodiments, but in many no bundling of video data is provided to allow for individual manipulation of streams.

It will also be appreciated that the schematic of FIG. 1 is simplified, and that in typical practice communication between users A-F over the communications lines 14, network 10, and bridge 12 may be routed through a plurality of computers, routers, buffers, and the like. For instance, each communications line 14 may include multiple routers and buffers between users A-F and the network 10. One advantage of IP protocol communications is that each individual packet of data includes a destination address and may be routed over any of several available paths between origination and destination. Accordingly, each of the communications lines 14 may vary somewhat for different packets—some packets may traverse a different path than other packets between the same source and destination. Further, it will be appreciated that virtual meetings such as videoconferences may include different numbers of users than users A-F illustrated, and may, in fact, include tens, hundreds, or even more users. With larger numbers of users the traffic load across communication lines 14 increases.

It will also be appreciated that the network 10 and communications lines 14 may not be dedicated to only the virtual meeting or videoconference taking place, and may not be dedicated to the users A-F and the network 10. Many other users may be sharing each communications line 14 to communicate with the network 10. There may be substantial additional data traffic taking place over the communications line 14 during the videoconference or virtual meeting. This additional traffic may compete with the data streams being communicated between the users A-F for the bandwidth and other network resources available over the communications lines 14 and network 10. At times, insufficient bandwidth may be available to carry all of the competing traffic over one or more of the lines 14, with the result that congestion causes some traffic delay or even loss. This can lead to an unacceptable quality of communications between the users A-F.

Another factor affecting the bandwidth and other resources consumed over the network 10 can be the applications used at each of the users A-F during the video conference. Various applications may be provided for use during the video conference, including for example a shared whiteboard on which each user draws, recorders, a chat board for exchanging textual messages, file transfer tools for exchanging files, games and gaming applications, video viewers, and the like.

Referring once again to FIG. 1 by way of illustration, in many applications such as those in which users communicate with one another on a regular or frequent basis, users A-F may remain connected or registered with a particular server 12 for ease of connection. Users A-F may register, log in, subscribe, or otherwise connect to the server when desired by communicating a pass key to the server 12. The term "pass key" as used herein is intended to be broadly interpreted as being a password or similar identifier that is known to the user and the server and that is useful as a security indicator to confirm to a server that a user is authorized to connect to it and/or to participate in a particular videoconference. A "pass key" may identify a meeting that is occurring at a particular time or location. Following registration, logging in, subscription or otherwise connecting for a videoconference, substantially continuous two-way communications may be undertaken between the user A-F and conference server 12 during which streaming audio and video data is communicated in both directions.

The conference server 12 may run an application referred to herein as a user presence application to determine which users A-F are presently connected and available for communication, and may publish or otherwise communicate a list of connected and available users A-F to each of the users A-F. Some user presence applications may operate substantially continuously to indicate which users are presently connected and available for videoconferencing. In many embodiments of the invention, presence applications operate before, during and after videoconferences so that user availability data is continuously provided—not just during a videoconference. Each user may have a unique identifier, such as an IP address, code, or name. When one of the users desires to communicate with one or more of the other users, he may communicate an invitation to them over the server 12, and if the other user(s) accepts the invitation the server 12 may create a conference bridge to link the user(s).

By way of further illustration, assume that each of the users A-F registers with the conference server 12 by establishing connection 14 to it and presenting a pass key, or through other steps. Server 12 then publishes a list of users available for conferencing that includes all of users A-F. User a desires to conduct a videoconference with users B-C, and therefore communicates an invitation to them over server 12. Both users B and C accept and communicate a corresponding confirmation to user A over the server 12. The server 12 then connects the three users A-C to one another, and each of users A-C begin to communicate streaming audio and video data to one another over the server 12.

Figure 4:
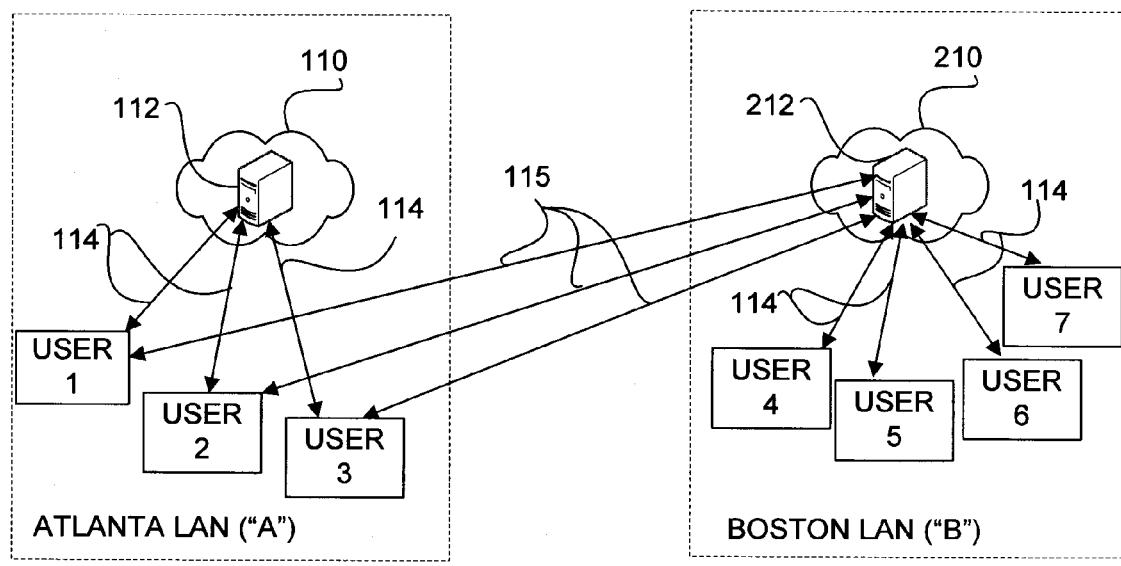
FIG. 4 is a schematic of a network practicing the prior art.

In many applications, include as an example a business or other organization that has multiple remote offices, several individual instances of the network 10 configuration of FIG. 1 may be present. FIG. 4, for example, is a network schematic of one such example. In this simplified example, one LAN is present in Atlanta (or "A"), and one in Boston (or "B"). This may represent, for example, two remote offices of one corporation. A has a LAN 110 and B has LAN 210. Each has a conference server 112 and 212. Users 1, 2 and 3 are locally connected to server 112 for conducting videoconferences with one another using links 114, and users 4 and 5 are locally connected to server 212 for conducting videoconference with one another via links 114. Connection of the users to their local conference servers may have included logging in, registering or other procedures of connection. The links 114 may be, for example, wired or wireless connections on a LAN at A and at B. In many invention embodiments once the links 114 are not established for any one particular videoconference, but instead are established on a longer term basis so that the users establish a longer term availability for participating in multiple different videoconferences over time.

Each of the users 1-5 may be, for example, individual users, conference rooms, or other users as illustrated and discussed above. They may be consistent with, for example, any of the users A-F discussed and illustrated herein above. Users 1, 2 and 3 have connected to the server 112 and presented a pass key to register themselves with the server 112, and users 4, 5, 6 and 7 have likewise registered, logged-in, or otherwise connected and indicated their availability for conferencing with server 212 by presenting a pass key.

The LAN A and LAN B are thereby distinct from one another, and in many embodiments are geographically remote from one another. Although connections may be made between the LAN A and LAN B, the different LAN's may be, for example, in different buildings, different cities, different states, or even different countries. As an example, the LAN A conference server may be located in a data center in City #1, with users 1 and 2 in a first office and user 3 in a second office in the same city. The LAN B conference server may be located in a business premises in City #2 with users 4-7 located at the same premises. City #1 and #2 may be in the same or different states, and may be distantly remote from one another. Many embodiments of the invention will provide increasing benefits and advantages over the prior art, in fact, with increased degree of geographic separation between the LAN A and LAN B.

The LAN A conference server 112 maintains user presence data for the users 1-3 and communicates it to each of the users 1-3 so that each user has current data regarding with of the other users are available for conducting a videoconference with. This is done before, during and after individual video conferences. Any of the users 1-3 may conduct a video conference with one another by communicating an invitation to another of the users 1-3 over the server 112 to conference, by communicating a request to the server 112 to connect to an existing conference, or otherwise communicating with the server 112. A similar configuration exists for the LAN B—each of the users 4-7 have registered with server 212 and may communicate with any number of each other over the server 212. Conference server 212 likewise runs a presence application to determine current availability of users 4-7 for conferencing. The LAN at A and LAN at B are generally separated from one another, although they may be able to connect to one another using the internet, PSTN, or other connections.

Additionally, it will be appreciated that invention embodiments are not limited to LAN's, but can be practiced using WAN's, MAN's and other networks and portions of networks that are remote from one another. Indeed, deciding whether a given network (or portion thereof) is a LAN, WAN, MAN or the like can in some cases be somewhat arbitrary. In some embodiments of the invention, for example, LAN A and LAN B may be different sub-portions of a single, larger network. In many invention embodiments, individual networks may be defined by the presence of one or more conference servers with locally connected users. As used herein in this context, the term "locally connected users" refers to videoconference users that are directly connected to a conference server without another conference server therebetween, although some devices including severs that are not functioning as videoconference servers may be between a locally connected user and the conference server.

In order to best appreciate some of the advantages of embodiments of the present invention, it will be useful to first illustrate some practices of other systems and methods. In one such system, if a user from LAN A wished to conduct a videoconference with any one or more of the users that were not locally connected to server 112 but instead were locally connected to remote conference server 212 and LAN B, it is necessary for the LAN A user to connect directly to the server 212. This has been illustrated by linkage 115, which may be, for example, a connection over the internet.

Establishing the linkage 115 in practices of other systems can be troublesome. Assume for example that each of users 1-3 from LAN A desired to conduct a videoconference with users 4 and 5 from LAN B. Firstly, the users 1-3 must know the network address for server 212, and secondly they must establish an individual connection 115 thereto. Connections 115 may be via the internet and established using an internet service provider, and may thereby not offer the reliability or bandwidth of the links 114 that are internal to the LAN. The limits on reliability and bandwidth of links 115 may be particularly heightened with increasing geographic distances between LAN A and LAN B. Very large distances may result in the links 115 involving multiple intermediary servers, links and the like.

Further, users 1-3 must be provided a pass key that server 212 will recognize, with the result that server 212 must be pre-loaded with information concerning the users 1-3. Users 1-3 also do not have user presence data for the users on LAN B, including the users 4-5 that they wish to conference with. They typically do not know, then, if the users 4-5 are available for conferencing until they connect with the server 212 and query it. This can lead to delays, additional connecting to the server 212 for the particular purpose of inquiring on user availability, and/or unanswered calls when users 4-5 are not available for conferencing.

Additional problems with other systems exist. For example, assuming that users 4 and 5 were available for conferencing with, and assuming that the server 212 recognized the pass keys from users 1-3, the server 212 may connect the users 1-3 to users 4 and 5 for videoconferencing. If the videoconference were to proceed, further assume that each of the users 1-5 were communicating one audio stream and two video streams. As a result, links 115 will each carry ten video streams (two from the user to the server 212, and eight from the server including two from each of the four other attendees to the user) and five audio streams. Taking user 1 as an example, data streams being communicated to and from it over link 115 can be summarized as follows:

|  | Outgoing Video Data streams: | Incoming Video Data Streams: |
|---|---|---|
| User 1 | 2 video streams | 2 video streams from User 2 |
|  |  | 2 video streams from User 3 |
|  |  | 2 video streams from User 4 |
|  |  | 2 video streams from User 5 = |
|  |  | 8 total streams |

This quantity of data over the links 115 may further challenge the reliability of the communications, particularly if the links 115 cover long distances. If end users are required to initiate these connections themselves, they may be intermittent and rely on different ISP's or other service providers. While a video conference service provider (such as a corporation with LAN's A and B) can generally control the quality of links 114 on LAN's A and B, those of links 115 may be beyond its control with a level of uncertainty thereby introduced.

Other videoconference communications systems and methods according to a schematic consistent with that of FIG. 4 could also present problems related to security. For example, the servers 212 and/or network 210 might be protected by firewalls that are difficult for connections 115 to traverse. This could be the case, for example, if the links 115 were established using an ISP over the internet. Each user may be required to obtain authorization before it is allowed to connect to the server 212.

Figure 5:
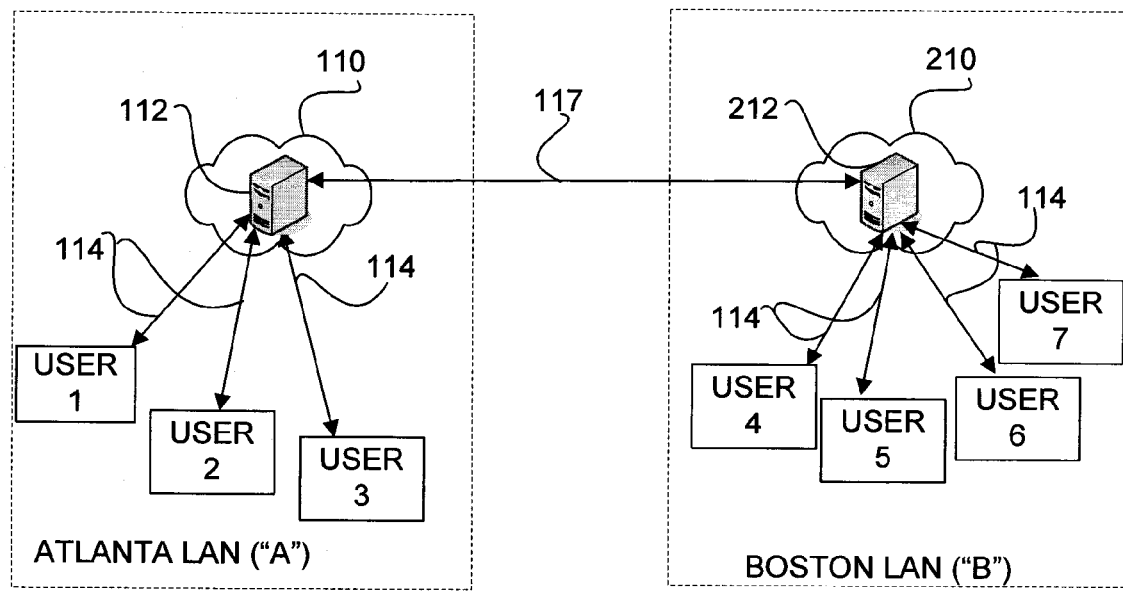
FIG. 5 is a schematic of a network practicing an invention embodiment.

These and other problems of other systems and methods are resolved by embodiments of the present invention. FIG. 5 is useful to illustrate some such embodiments. In the method, system, and program product that are illustrated by FIG. 5, the servers 112 and 212 have been configured to communicate with one another over high bandwidth connection 117 for the purpose of facilitating efficient communications between any of the users 1-3 and 4-7 for conducting videoconferences. The remote conference servers 112 and 212 may be (but are not necessarily) federated with one another. The configuration of the servers 112 and 212 represent novel and valuable advancements that achieve important benefits over the prior art.

It will be appreciated that although they are schematically illustrated in similar manners, the connection 117 is significantly different than the connections 115. In many (but not all) embodiments, high bandwidth connection 117 is a dedicated and substantially permanent connection. As used herein, the term "dedicated" when used in this context is intended to be broadly interpreted as use primarily for the purpose of communicating data related to videoconferences. Put another way, a dedicated link 117 is primarily used to carry data between conference servers related to videoconferencing. In some applications, the dedicated link 117 is exclusively used for such purposes—it only carries data between conference servers that is related to videoconferences. In some other applications, however, other data may be carried over the high bandwidth link 117. As used in this context, the term "permanent" is intended to be broadly interpreted as being different from temporary. A permanent videoconference communications link lasts much longer than a temporary videoconference communications link—a permanent link lasts through several different videoconferences. A permanent link as used herein, however, does not necessarily need to last "forever."

A high bandwidth link 117 may result, for example, if a service provider is contracted with to provide a constant connection between the servers 112 and 212 that exists before, during and after individual videoconferences. In many applications connection 117 will also be very high bandwidth, low latency and highly stable to ensure efficient communication of large amounts of real time data that may be carried in many videoconference applications, and particularly in those in which large numbers of users are in real time two way audio and video communication with all other users.

The particular details of connection 117 will vary with application, but in some applications of the invention the connection may be a high-speed IP backbone or trunk connection. In some applications connection 117 will be at least 1.5 Mbps, in others at least 45 Mbps, in others at least 100 Mbps, in others at least 155 Mbps, and in others at least 1 Gbps. Such connections are available from vendors such as Level 3 Communications, Broomfield, Colo.

Also, in many invention embodiments the connection 117 exists before, during and after individual videoconferences so that it is used for multiple different videoconferences. In these embodiments the high bandwidth connection 117 is "always on." In some embodiments, the same connection 117 is used for communication of all audio, video, application and other data between conference servers 112 and 212 during multiple different videoconferences that the two federated conference servers communicate with one another during. This can be contrasted with connections 115 and others of other systems that are dynamically established only when needed for a particular videoconference, and that may have been different connections from conference to conference (since they were established on a dynamic, as called-for basis).

Connection 117 achieves several benefits and advantages over the connections 115 of other systems that were established from individual users to the remote server. Connection 117 may have a significantly higher bandwidth capability, lower latency, and may be more stable and reliable, for example. It may be established on a substantially permanent basis by contracting with a communications service provider that is known to have reliable and high bandwidth connectivity between locations where the two different servers 112 and 212 are located. Connection 117 can also be maintained and/or owned by the corporation or other entity that maintains LAN's A and B to further ensure quality.

Although dynamic establishment of links such as 115 of other systems would be expected to offer reduced costs and resource consumption as compared to the link 117 of some embodiments (since they only existed on an as-needed basis), it has surprisingly been discovered that in many applications the high speed connections 117 established on a more permanent basis (that exist over several conferences, for example) offer unexpected advantages and benefits. These may be particularly valuable in applications that feature large scale conferences and conference servers that are geographically remote from one another. In many applications the benefits and advantages of invention embodiments increase with increasing physical separation of federated conference servers—greater degree of separation often added higher risk of unstable and high latency communications using links 115 of other systems. Other invention embodiments, however, will include different servers that are not geographically remote. Some applications, in fact, will enjoy benefits of practice of the invention on servers that are located together in the same location.

Also, using the high bandwidth link 117 may resolve many of the problems of other systems related to firewall or other security device traversal by connections 115 (FIG. 4). Where connections 115 were often intermittent connections using transient network, port and/or IP addresses and routing to reach the server 212, (e.g., assigned on demand by a service provider), the high bandwidth link 117 may be present on a permanent basis and use known and constant ports, addresses and routing. These factors facilitate easier firewall and other security device traversal. Remote users don't need to connect to remote server ports, but instead the federated servers have established ports that are open to one another. In some embodiments the routing employed by high bandwidth link 117 may change from time to time as may be necessary to address congestion, component failure, and the like.

In many embodiments of the invention further benefits and advantages are achieved since unicast communications of data, including video data streams, can be used effectively even when multiple participants are receiving the data. Although embodiments of the invention may be practiced using multicast, broadcast or other communication methods, many embodiments employ unicast with great success. These embodiments of the invention through coordination and linking of remote servers achieve scalability, efficiency and other benefits typically associated with multicast communications while employing unicast communications. This is advantageous since multicast is known to have stability, security and other limitations that unicast does not. Accordingly, embodiments of the invention achieve many of the benefits of multicast communications without the disadvantages.

Coordination of servers 112 and 212 to conduct communication of video and/or audio streams between LAN's A and B in a much more efficient manner than was possible suing other systems and methods further requires corresponding configuration of the servers 112 and 212. In many (but not all) invention embodiments the remote servers are federated with one another. Those knowledgeable in the art will appreciate that federated servers are connected to one another and in many aspects operate and may be treated as a single server. Two federated servers 112 and 212 in an invention embodiment may therefore be treated and operate as a single server from the perspective of any of the users locally connected to either server 112 or 212.

Also, in some embodiments of the invention, one or both of the servers 112 and 212 are configured to avoid communication of multiple duplicate streams when possible. This can be accomplished, at least in part, by replacing communication of multiple copies of the same stream to users with communication between federated servers of only a single stream followed by copying of the single stream by the receiving server and then communication of copied streams to individual users.

By way of example, consider the schematic video conference illustrated above with respect to FIG. 4. In that example, each of users 1-3 participated in a videoconference with the users 4-5, and a total of 10 video streams were communicated over each of the prior art links 115—a total of 30 video data streams over the three links 115. When practicing an embodiment of the present invention, significant efficiencies are achieved over this.

This can best be illustrated by considering one particular video data stream. When practicing an embodiment of the prior art illustrated in FIG. 4, a video stream was received from user 4 and one individual copy of it was communicated by conference server 212 to each of users 1-3 with the result that three total copies of the stream were communicated over the three links 115.

With reference to FIG. 5, in an embodiment of the present invention a single copy of the video stream from user 4 is received by server 212 and communicated to server 112 using the dedicated link 117. Server 112 then copies the stream and communicates individual copied streams to each of users 1-3. The quantity of data communicated between federated servers 112 and 212 (and therefore required bandwidth) for this single stream has thereby been reduced by ⅔ or 66%. Such savings are accomplished not only for this single stream, but for all streams being communicated between users 1-3 and 4-7. This represents an important and beneficial advantage over the prior art. It has been discovered that even greater efficiencies are achieved in many applications based on not only the reduced bandwidth demands, but further because of the increased resources and reliability of link 117 as compared to links 115 of the prior art.

Figure 6:
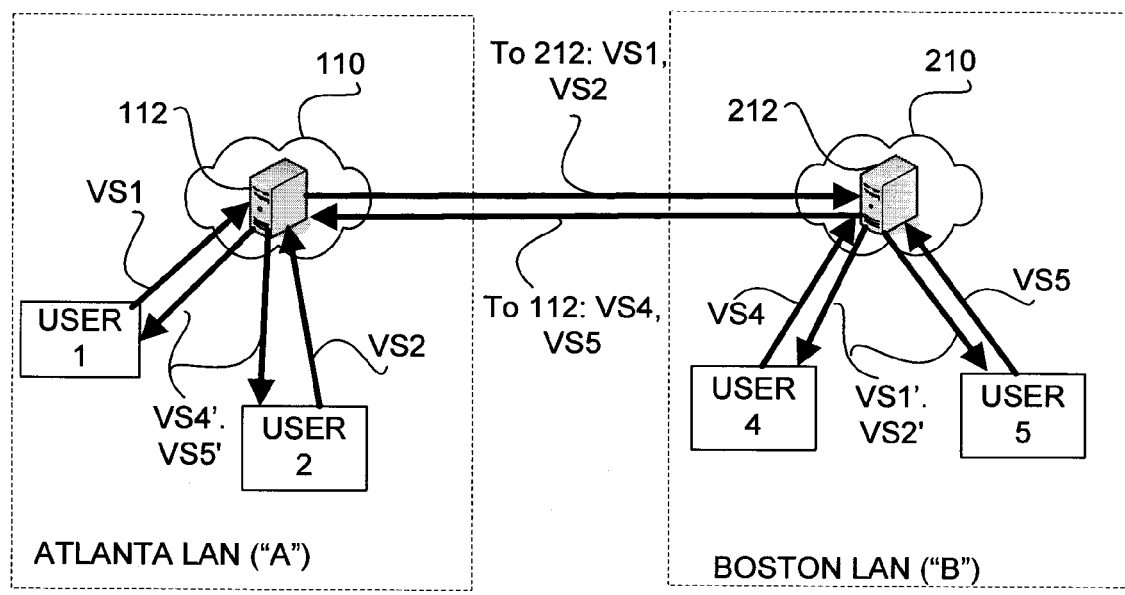
FIG. 6 is a schematic of a network practicing an invention embodiment.

This and other aspects of invention embodiments can be further appreciated by considering the schematic of FIG. 6 which schematically illustrates a video conference being conducted between users 1 and 2 at LAN A and users 4 and 5 at LAN B. Users 1 and 2 each communicate a single video stream VS1 and VS2 to server 112 (using links 114 of FIG. 5), which then communicates the streams VS1 and VS2 to server 212 (using link 117 of FIG. 5). Server 212 then copies each stream VS1 and VS2 into copied streams VS1' and VS2' and communicates one each of these to each of users 4 and 5.

Likewise, users 4 and 5 each communicate a single video stream VS4 and VS5 to server 212 (using links 114 of FIG. 5), which then communicates the streams VS4 and VS5 to federated server 112 (using link 117 of FIG. 5). Server 112 then copies each stream VS4 and VS5 into copied streams VS4' and VS5' and communicates one each of these to each of users 1 and 2. In this manner, only a single copy of each of stream VS1, VS2, VS3 and VS4 is communicated over the "long hop" link 117 between servers 112 and 212. Copying of those streams is then performed at receiving servers. This accomplishes significant resource and efficiency benefits over the prior art.

Achieving these advantages of one invention embodiment requires that the servers 112 and 212 be configured to carry out certain steps. This may be accomplished, for example, by storing a program product of the invention in a tangible memory medium in the servers 112 and/or 212 or on a computer connected thereto for carrying out instructions and causing the servers 112 and 212 to perform certain steps.

Figure 7A:
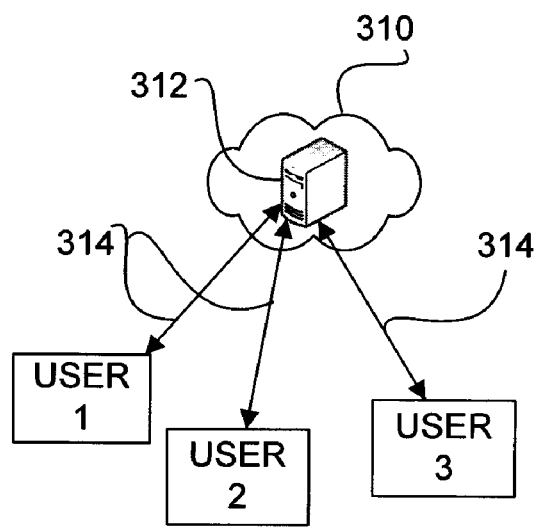
FIGS. 7A and 7B are schematics of a network useful to illustrate an invention embodiment.

These steps may include, among others, causing the conference servers to recognize a user identifier for a user that is locally connected to a different server and treat communications with that user differently than communications with locally connected users are treated. As an example, FIG. 7A shows a schematic in which a server 312 facilitates a videoconference between 3 locally connected users 1-3 over WAN 310. In such circumstances, the server 312 receives a single stream from each of the users 1-3, copies it and then sends copied streams to each of the other users. User 1, for example, sends a single video stream to server 312 which then sends two copies of this stream on—one to each of users 2 and 3. Similarly, the program instructions may cause the conference server 212 to connect to the server 112 as a client on behalf of multiple users (users 4 and 5), and for server 112 to treat federated server 212 as a single client regardless of how many videoconference attendees are locally connected to server 212.

Figure 7B:
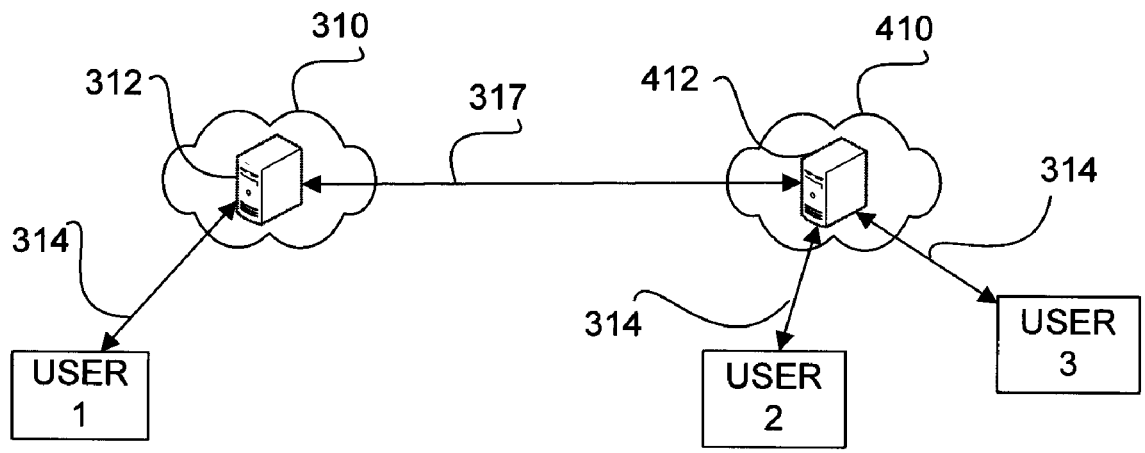

The schematic of FIG. 7B illustrates an altered configuration in which users 2 and 3 are not registered with or locally connected to server 312 on WAN 310, but instead are remotely located on a different WAN 410 and registered and locally connected to server 412. In this instance, when server 312 receives a request from user 1 to participate in a videoconference with users 2 and 3, it identifies these users as not being locally connected but instead being connected to the federated server 412 on a different WAN 410. As a result, it communicates with users 2 and 3 differently than it does under the circumstances of FIG. 7A.

As an example, server 312 does not copy the single video stream it receives from user 1 for sending to each of users 2 and 3. Instead, it recognizes that users 2 and 3 are not locally connected but instead are registered with and locally connected to the federated server 412 and sends a single copy of the stream from user 1 to server 412 for replication and forwarding to users 2 and 3. In invention embodiments that can be illustrated by FIG. 7B, the server 312 accordingly treats the federated server 412 as a client. The server 412 acts as a client on behalf of one or more videoconference clients (users 2 and 3) when communicating with federated server 312.

In some invention embodiments, a virtual meeting such as a videoconference will take place at some network location where one of the servers 312 or 412 virtually links participating users to one another. This location may have a network or other identifiable address, which may reside on one of the networks 310 or 410 and/or the servers 312 or 412. The location of the meeting bridge may ultimately determine which federated server joins the meeting as a client. If the meeting is hosted on the network 410 or by server 412 for example, then the remote federated server 312 may join the meeting as a client, and the federated server 412 will treat communications with the server 312 as if it was communicating with a client.

Embodiments of methods, systems and program products of the invention facilitate the special treatment of users that are remotely connected through various steps and configurations. As an example, each of the users 1-7 of FIGS. 5 and 6 may be assigned identifiers that indicate which LAN and/or local server they are connected to. Identifiers may include a first and second field, level or other portion, for example, that each carry some information. A first field may indicate a local address on the LAN and a second level may indicate which LAN. One simple example is the identifier "user1.A" which may provide an address for user 1 on the LAN ("user1") in a first level (or field or portion) and the LAN ("A") in the second level (or field or portion).

In some embodiments, if no second level of identifier information is present, the server concludes that the identifier must refer to a user that is locally connected. For example, if a request to conference with a user identified as "user2" is received by server 112, it treats the lack of a ".A" field in the identifier as indicating that the user must be locally connected on LAN A.

Referring again to the schematic of FIG. 5 by way of example, if the server 112 determines that any users are to be communicated with during a video conference that are not locally connected or registered, it communicates with them via the federated server 212 that those users are locally connected or registered with instead of communicating directly with them. If server 112 receives a request from user 1 to invite user 5 located at "user5.B" to participate in a video conference, server 112 can determine from the ".B" field in the pass key or identifier "user5.B" to determine that user 5 is not locally connected or registered, but is instead connected to LAN B and/or that user 5 is registered or locally connected to federated server 212. In this case, server 112 need not communicate directly with user 5, but instead forwards the invitation (as well as subsequent communications destined for user 5) to server 212 for forwarding on to user 5.

Also, if the server 112 determines that two or more users are being communicated with during a videoconference that are not locally connected but are instead connected to a remote federated server (e.g., server 212), it communicates only a single video stream for all of those users instead of sending an individual copy for each. This is useful to achieve the resource and efficiency advantages discussed above.

Figure 8:
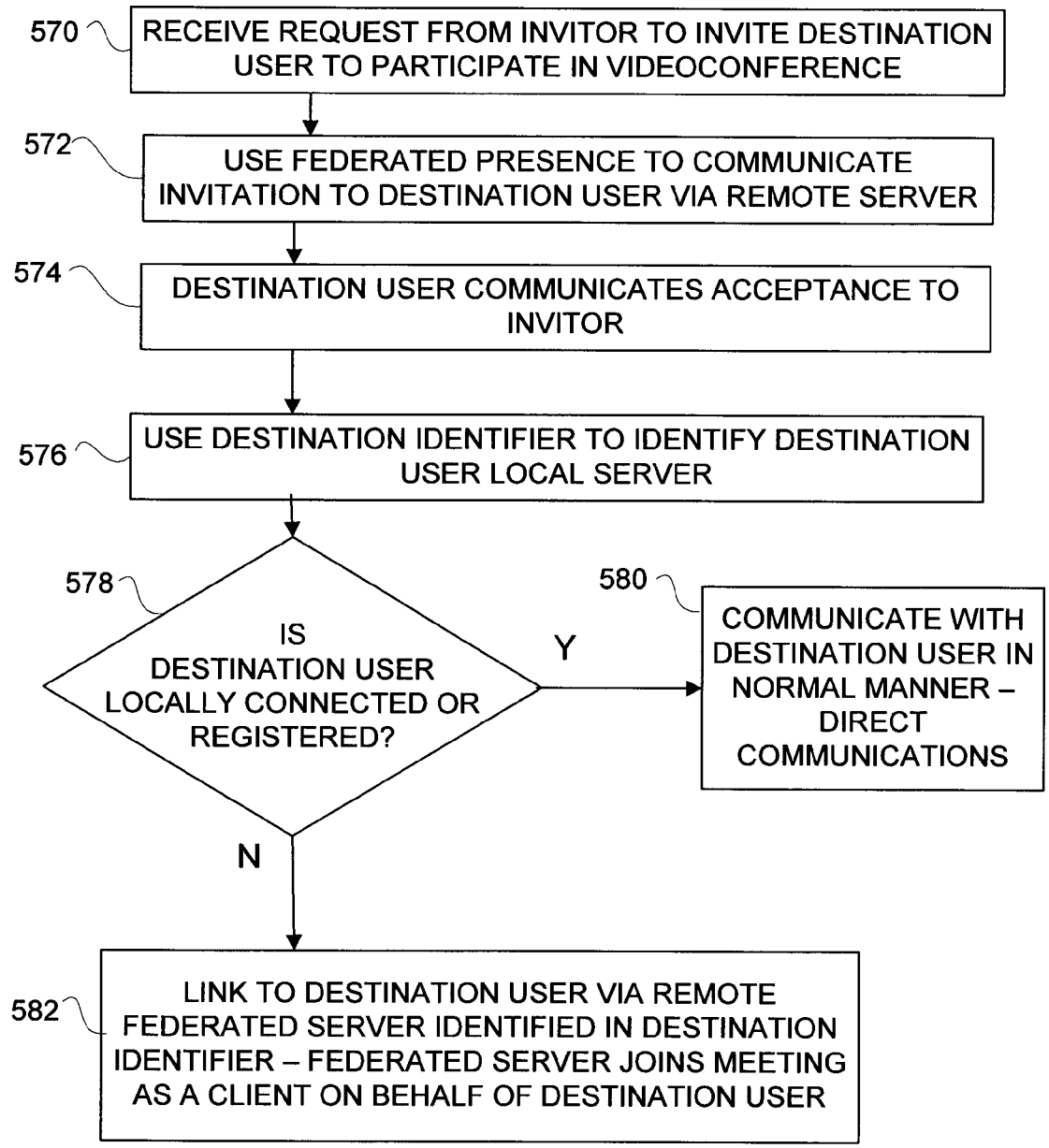
FIG. 8 is a flowchart illustrating an invention embodiment.

These aspects of some invention embodiments may be further illustrated through consideration of the flowchart of FIG. 8. This chart is useful to illustrate a method embodiment, the logical configuration of a system embodiment, and a program product of the invention. A program product embodiment according to FIG. 8, for example, may be stored in a tangible memory of server 112 (or another computer on LAN A) and when executed may cause the server 112 to carry out its steps.

At 570 the server receives from an "inviter" a request to invite a user (the "destination user") to participate in a videoconference. This may entail, for example, server 112 receiving a request from user 1 to invite user 5 to participate in a videoconference. The server then uses a federated presence engine that is receiving user presence data from all users on all federated servers to communicate the invitation to the destination user. Block 572. This may include, for example, a presence element running on server 112 communicating the invitation to a presence element operating on federated server 212 over the link 117, and then on to user 5. The destination user 5 communicates its acceptance via the federated presence engine. Block 574.

The server 112 then uses the destination identifier of the destination user to identify the local server that the destination user is locally connected to. Block 576. One example of this step is using the destination user identifier to determine if it specifies a user connected to a remote LAN/WAN/server. For example, the server 112 may be configured to conclude any user identifier that includes a ".B", "@B", other extension indicating LAN B, or other information that identifies server 212 is destined for a remote user. If the destination user is locally connected, communications with the user are carried out in a standard manner—they are direct. Block 580.

If the server determines that the destination user is not locally connected, the embodiment of FIG. 8 proceeds to determine that the user is remote and therefore that communications should be carried out through a remote federated server. Block 582. The identifier for the destination user is used to identify which remote server should be communicated with. Block 582. Taking the identifier "user5.B" as an example, the server can determine that the server 212 should be communicated with based on the ".B" extension. The server 212 may have a look-up table, data repository or other accessible data that provides an address for reaching the server 312 that corresponds to the ".B" extension. Or, in some embodiments, the actual network address may be provided in the identifier, with an example being a URL, e-mail address, domain, IP address, or the like. In such cases provided cross referenced data in a depository beforehand may not be necessary.

Other steps for confirming whether a user is remote or local and for identifying a remote server can be practiced by other invention embodiments. For example, use of one or more look-up tables or other data repositories can be used which include a list of remote users cross referenced with their corresponding federated servers. Also, other formats for user identifiers can be used, including for example URL's, IP addresses, e-mail addresses, and the like.

Referring once again to the flowchart of FIG. 8, after the server has identified the remote federated server, that remote server joins the meeting as a client on behalf of the locally connected destination user. Block 582. That is, remote server 212 joins the meeting as a client on behalf of user 5.

If additional users are later identified that correspond to the same remote server as the first remote user, efficient stream communication rules are followed. In particular, only a single copy of each stream is communicated to the corresponding remote server as opposed to communicating one each of the stream for one each of the remote users connected to the remote server. One example embodiment of this step can be further illustrated by consideration of FIG. 6. Server 112 communicates only a single version of video stream VS1 from user 1 to federated server 212 even though two copies will eventually be required (one each for user 4 and user 5). In some embodiments, some instruction is communicated with the single stream to the remote server indicating which plurality of users connected to that server are to receive the stream so that copies can be made and forwarded to the corresponding users.

It will be appreciated that although the embodiment of FIG. 8 has been illustrated through consideration of operation of server 112 in the schematic of FIG. 6, some or all of the steps could likewise be executed by the server 212. That is, the logical configuration and location of performance of steps is not necessarily limited to one or the other of servers that are configured for communicating with one another. In some embodiments, for example, the steps of the flowchart of FIG. 8 may be practiced by the server 112 and/or 212. Other steps of methods and program products of the invention may likewise be distributed so that one or more servers or other computers carry out various of the steps.

It will also be appreciated that although FIG. 8 and other example embodiments discussed herein have been illustrated with respect to inviting others to participate in videoconferences, other invention embodiments may include steps of joining existing conferences. Referencing FIG. 7B by was of example, if users 2 and 3 are participating in a videoconference they may invite user 1 to join, or user 1 may request to join the existing meeting. This can be accomplished using systems, methods and program products of the invention in a more efficient and less resource intensive manner than the prior art through federated servers 112 and 212, and communication over link 117 as generally described above. Accordingly, it will be appreciated that as used herein the term "invite" when used in the context of videoconference participation is not limited to initiation in a newly created videoconference but likewise may refer to joining an existing videoconference.

Some invention embodiments achieve further efficiencies and advantages over the prior art through monitoring of remote user use of communicated data. Referring to FIG. 6 by way of example, server 112 communicates a single copy of video stream VS1 to federated server 212. Server 212 communicates one copy of stream VS1 to each of users 4 and 5. In some embodiments of the invention, server 112 monitors the use of stream VS1 by users 4 and 5. If the video stream VS1 is not being viewed by either of users 4 or 5, server 112 will terminate communication of it to avoid unnecessary consumption of resources. This might occur, for example, if users 4 and 5 participate in a videoconference in which they initially view both video streams VS1 and VS2, but at some point during the conference both turn off stream VS1 while remaining connected to the conference and while continuing to receive stream VS2. Those knowledgeable in the art will appreciate that there are a number of ways for the server 112 to monitor remote users' use of communicated data streams. Further, in some invention embodiments the monitoring may be performed by server 212 as an alternative to server 112.

Some embodiments of the invention also achieve benefits and advantages over the prior art related to universal user presence data. In many videoconference systems and methods of the prior art, users locally connected to a first server were not able to easily determine which users were currently connected to a remote second conference server. Doing so might require, for instance, initially contacting the remote conference server, inquire as to current user availability, and wait for a response. This required time and network resources. Referring once again to FIG. 4 by way of example, if user 3 desired to determine which of users 4-7 were connected to server 212 and available for conferencing, a link 115 would need to be established to server 212 for corresponding inquiries. Some embodiments of the invention resolve these shortcomings.

In some embodiments of the invention remote servers report user presence to one another for forwarding to local users. Referring again to FIG. 5 by way of example, each of the federated servers 112 and 212 are configured to operate a user presence application to determine which users are connected to the respective LAN's and thereby available for videoconferencing over the LAN with others of the locally connected users. The user presence application can take the form of various different forms and functionality. It may be, for example, a polling mechanism that repeatedly pings locally connected users to determine if they remain connected, with examples being on some regular time interval such as every 10 seconds, every 30 seconds, every minute, every 5 minutes, and the like. Other presence applications may simply rely on users to report to the server (either manually or through an automated process) when they connect or disconnect from the conferencing server, and when they are engaged in an existing conference. Still other presence applications may be more sophisticated and actively determine when users are connected, disconnected, engaged in a conference, or have other status without requiring the resources of repeated polling or reporting from the user. Logic may be employed, for example to detect these and other events without any action on the user part, and without any interrogation of the user computer by the conference server.

The federated servers 112 and 212 communicate the user presence data to the local users connected to their respective LAN's so that those users are aware of which other users are available for videoconferencing over the LAN. In this manner, for example, server 212 communicates user presence data to each of the users 4-7 indicating which are currently available for videoconferencing.

In some embodiments of the invention, each of the federated servers 112 and 212 are also configured to communicate user presence data (for locally connected users and available for videoconferencing) to the other of the servers 112 and 212. That is, server 112 communicates user presence data concerning users 1-3 to server 212; and server 212 communicates user presence data concerning users 4-7 to server 112. The servers 112 and 212 are further configured to receive the user presence data for users present on a different LAN and to communicate it to the users present on their local LAN.

Server 112 communicates the user presence data concerning users 4-7 that it received from federated server 212 to users 1-3, and server 212 communicates the user presence data concerning users 1-3 that it received from server 112 to users 4-7. The respective servers 112 and 212 may provide the user presence data to the other server in a manner that ensures that it is current. For example, user presence data may be repeatedly provided on regular intervals, may be provided substantially continuously, may be provided any time there is a change in the presence data, and/or according to other protocols to ensure accuracy and that it is current.

In this manner the users 1-3 at LAN A are advised of which of the users 4-7 at LAN B are available for videoconferencing with, and the users 4-7 at LAN B are advised of which of the users 1-3 at LAN A are available for videoconferencing with. In some embodiments, there may be little distinction to a particular user as to whether another user is available for videoconferencing over the local LAN or over the remote LAN. Invention embodiments may include providing current lists to users indicating which other users are currently available for participating in a videoconference. A list of user names may be provided, with indications for each name as to status, including such example status indicators as "available for conferencing," "currently in conference," "currently unavailable," "do not disturb," and the like.

Figure 9:
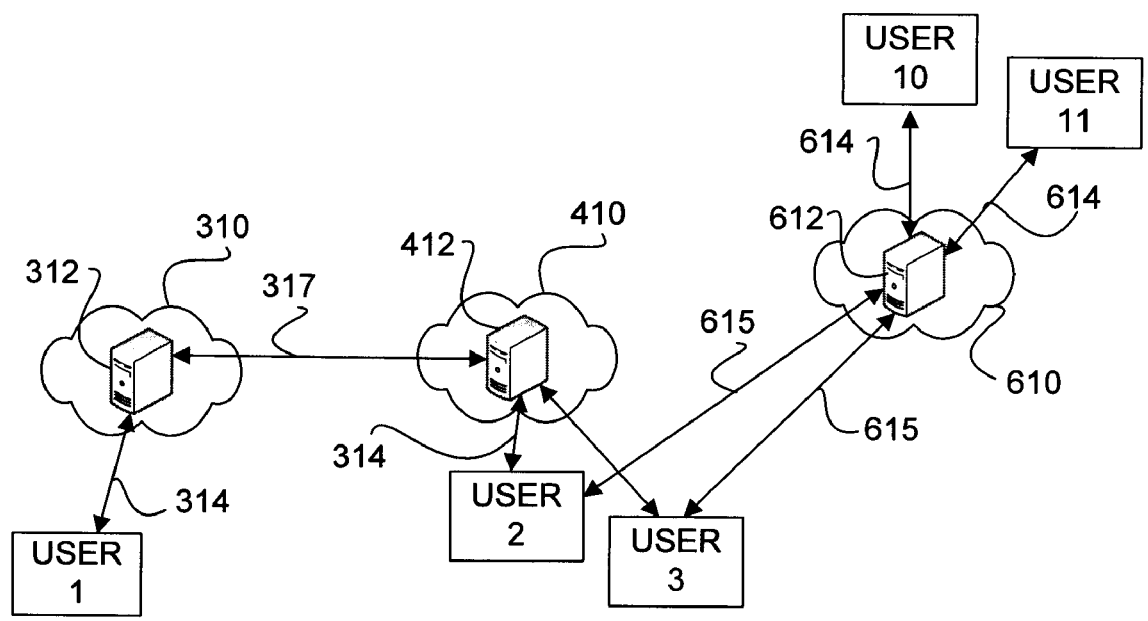
FIG. 9 is a schematic of a network useful to illustrate an additional invention embodiment.

Some embodiments of the invention are suitable for practice in videoconference environments where some remote servers are federated and some are not. That is, some methods, systems and program products of the invention are suitable for practice when some conference servers have been linked and otherwise configured for highly efficient videoconference communications and others have not. FIG. 9 is useful to illustrate such embodiments. Portions of FIG. 9 are consistent with FIG. 7B discussed above. In particular, FIG. 9 includes federated servers 312 and 412 linked by high bandwidth connection 317 for highly efficient videoconference communications between users 1, 2 and 3. As described above, federated servers 312 and 412 may be communicating user presence data to one another and otherwise facilitate efficient communication of video and audio streams between users 1, 2 and/or 3 during videoconferences in which all users engage in real time, two way communication of audio and video data.

In some invention embodiments, users 1, 2 and 3 may also be able to participate in videoconferences with other users connected to other remote conference servers that are not federated or otherwise directly linked to conference severs 312 or 412. FIG. 9 illustrates, for example, non-federated server 612 that has users 10 and 11 connected thereto. In some invention embodiments, if users 2 and/or 3 communicate an invitation destined for users 10 and/or 11 to participate in a videoconference to the server 412, it examines the identifiers for the users 10 and 11 and determines that they are not locally connected or connected to federated server 312.

The server 412 may accomplish this by, for example, examining a field of the identifier and comparing it to a collection of corresponding stored fields that correspond to various federated servers that it has been provided with. As an example, the invitations may be directed to the identifiers user10@612.com and user11@612.com. After comparing the "612" extension to data (such as a table), the server 412 concludes that it does not match an identifier field for any federated server, and therefore that there is no high bandwidth communication link (such as connection 317) between it and the destination server.

In some invention embodiments, the server 412 then issues a redirect message back to the user from which the invitation was received. The redirect message may, but does not necessarily, include an address for the server 612. After learning from the server 412 that the server 612 is not federated with it for efficient communications, the users 2 and 3 must directly connect with the server 612 using links 615 which may be, for example, temporary links over the internet that are at least partially provided by one or more internet service providers.

It will be appreciated that discussion, examples, and FIGs. provided herein have been simplified to illustrate embodiments of the invention. In many of the examples discussed herein, practice of invention embodiments has been illustrated with reference to communication of video data only. Other data may be communicated during videoconferences of the invention, and such communications can achieve important gains in efficiency and reduced resource consumption through practice of invention embodiments. Audio and application data are two examples. Generally, however, video data may offer a prime opportunity for achieving savings. This may be the case in many applications since video data tends to be sizable and resource intensive. Additionally, audio data communicated during videoconferences may be bundled to increase communications efficiencies, while video data is often communicated in un-bundled, discrete streams.

Also, in practice invention embodiments may be significantly larger in scale. By way of example, many invention embodiments have been illustrated showing only two servers in federated communication for efficient videoconference communications. In practice many more than two servers can be federated, with 5, 10's, hundreds, or even thousands of servers federated and linked to one another for highly efficient videoconference communication are some examples of the possible scale of invention embodiments. Indeed, it will be appreciated that advantages and benefits of invention embodiments include that they are highly scalable and can be easily expanded.

In many real-world applications, in fact, it will be common to practice an invention embodiment where relatively large numbers of federated servers are spread out over wide geographic areas. This is a typical application in which videoconferencing solutions have proven valuable—where users are remote from one another but where immersive communications with one another is useful. In such applications, embodiments of the invention may include establishing direct links between multiple servers on a fully meshed basis. That is, a grid of multiple remote servers in which the servers are linked substantially directly to one another may be used to practice embodiments of the invention.

Figure 10:
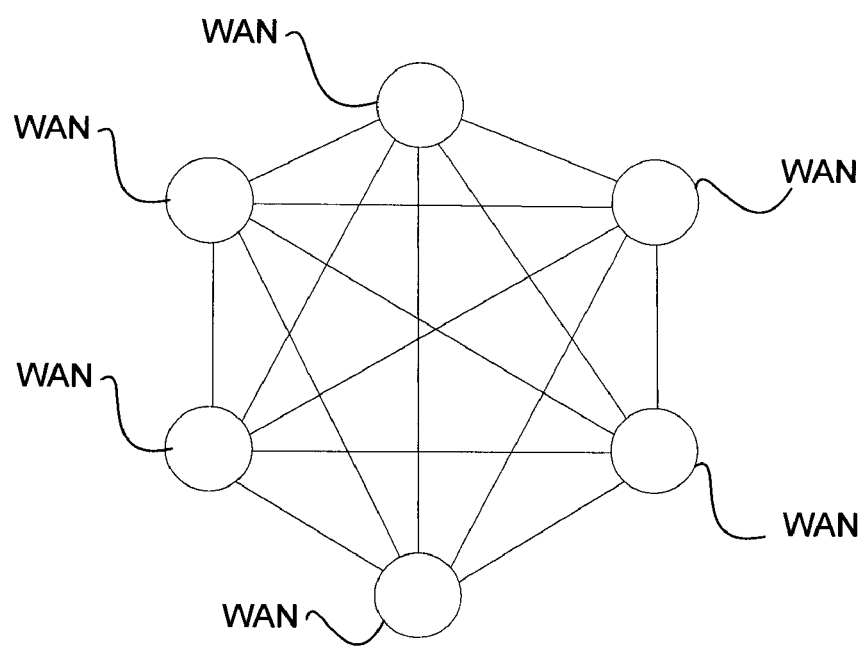
FIG. 10 illustrates a fully meshed set of multiple servers useful to practice some invention embodiments.

FIG. 10 is a schematic of one example grid with servers fully meshed. Each WAN represents a videoconference server with a plurality of locally connected users. Each WAN is directly linked to each other of the WAN's using a high bandwidth high speed link to facilitate efficient communication of video and audio data between users on different WAN's as described above within practice of invention embodiments. As shown, the direct link connects each WAN to each other without any WAN therebetween for efficiency of communications. In practice, some elements may of course exist between WAN's, including routers and the like. As used herein, the term "direct connection" when used in this context is intended to refer to connection without any other conference servers therebetween while allowing for some other intermediary elements, with an example being routers and the like. Also, in some applications it may be desirable to use a daisy-chain configuration for some links as opposed to direct links. If A and B are connected using a very high speed link, for instance, but C and A are connected with only a low speed link, it may be more efficient to communicant C to B to A as opposed to A to C.

Figure 11:
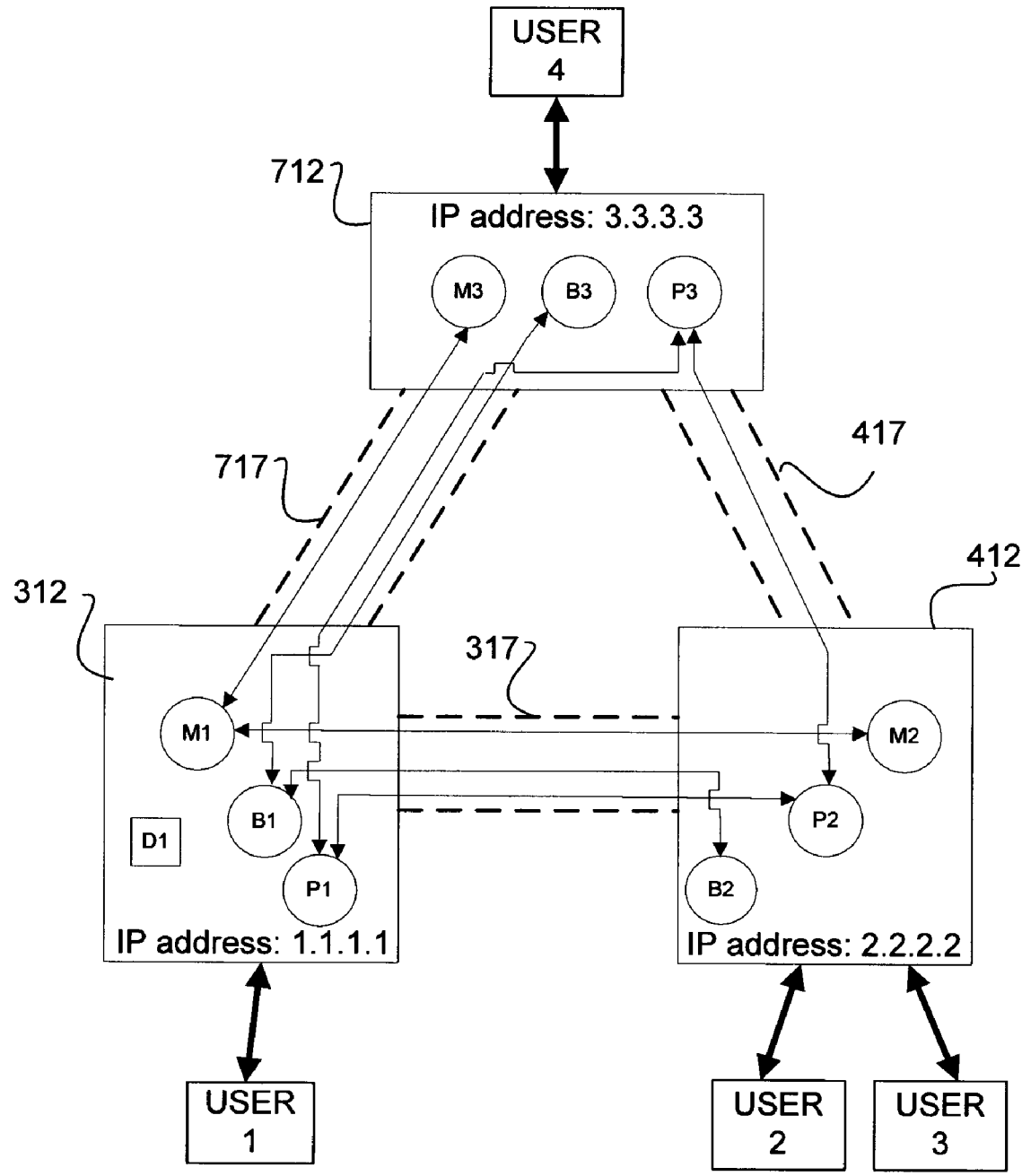
FIG. 11 is a schematic of a network useful to illustrate an additional invention embodiment.

FIG. 11 is useful to illustrate some embodiments of the invention in more detail, including those in which more than two conference servers are federated with one another for efficient data communications during a videoconference. FIG. 11 schematically illustrates three different conference servers 312, 412 and 712 all with locally connected users. Each of federated conference servers 312, 412 and 712 have various software elements running on them and communicating with one another, including a presence element (P1, P2, P3) for collecting and reporting current connectivity/availability status of other users, a meeting manager (M1, M2, M3) for managing aspects of videoconferences, and a bridge element (B1, B2, B3) for creating and maintaining conference bridges that interconnect users.

Other elements related to initiating and conducting videoconferences may also be present. These elements may be stand alone routines that interact with one another as required, may be functions within a single set of program instructions, or may be arranged otherwise. The servers 312, 412 and 712 may be one or more computers, and may be operating a Linux or other operating system to run their various elements. Although not illustrated, the conference servers may be located on individual networks, such as a LAN or WAN.

Server 312 is at IP address 1.1.1.1, server 412 at 2.2.2.2, and server 712 at 3.3.3.3. Each may considered to be located on a different LAN/WAN/at a different data center, or the like. Each may be considered to be remote from the other, and located (for example) in different states. The three conference servers 312, 412 and 712 are directly linked to one another using high bandwidth links shown as dashed line "pipes" 317 (conference server 312 to server 412), 417 (conference server 412 to server 712), and 717 (conference server 712 to conference server 312). Links 317, 417 and 717 may be, for example, high speed backbone data lines provided by a network carrier.

In order to further illustrate some invention embodiments, the process of user 1 initiating a videoconference with user 2 will be described. User 1 communicates with meeting controller element M1 that is running on server 312 and creates a meeting 123J@1.1.1.1. This identifier, which for purposes of the present invention can be considered a pass key, includes a meeting name "123J" and an IP address where the meeting will be hosted (1.1.1.1). M1 adds the meeting to a database D1 running on server 312. User 1 then requests that M1 permit it to join the newly created meeting 123J@1.1.1.1. M1 recognizes the meeting identifier as corresponding to a locally hosted meeting (based on the 1.1.1.1 IP address), retrieves meeting information from the database D1 (which may include various meeting parameters), and communicates meeting information for this meeting to user 1.

With this information in hand, user 1 communicates a request to bridge element B1 running on server 312 and asks that it be joined to meeting 123J@1.1.1.1. B1 then requests meeting record details from the meeting manager M1 for meeting 123J@1.1.1.1. M1 recognizes the 1.1.1.1 IP address extension as corresponding to a locally hosted meeting, and retrieves meeting record details from database D1 and provides the same to bridge B1. With this information B allows user 1 to join the meeting.

Because the servers 312, 412 and 712 are federated with one another through an invention embodiment, they are continuously connected and sharing locally connected user presence data. This is illustrated in FIG. 10 through presence elements P1, P2 and P3 running on each of the conference servers and being linked to one another over the high bandwidth links 317, 417 and 717 which have been established for the purpose of carrying data related to videoconferencing, and therefore may be considered to be "dedicated" links for convenience (although data unrelated to videoconference may occasionally be carried over the links). User 1 is therefore presented with a current list of other users connected to any of the servers 412 and 712 and available for conferencing, including user 2 (locally connected to federated conference server 412). Each user is thereby provided global presence data—they have a complete list of all users available for conferencing and their current status.

User 1 invites user 2 to join the meeting 123J@1.1.1.1 using presence element P1. Because P1 is in communication with presence element P2 running on federated conference server 412, P1 has data showing user 2 to be available for conferencing and to be locally connected to server 412. Presence element P1 communicates an invitation to presence element P2 using dedicated link 317.

User 2 receives the invitation to join meeting 123J@1.1.1.1 communicated via P2 and accepts the invitation. User 2 requests meeting manager M2 running on its local server to join meeting 123J@1.1.1.1. M2 recognizes that the 1.1.1.1 extension is not local and that it corresponds to federated server 312. M2 therefore requests meeting details for the meeting from meeting manager M1 using dedicated link 317, M1 retrieves the information from database D1 and communicates it to M2. M2 then communicates the information to user 2.

User 2 then sends a request to the bridge B2 running on its local server 412 to join the meeting 123J@1.1.1.1, and B2 requests meeting information from local meeting manager M2. M2 once again retrieves meeting information from meeting manager M1 using dedicated link 317, and M1 once again retrieves required information from D1 and communicates it to M2 over dedicated link 317. It will be noted that in some invention embodiments it may be desirable to cache certain information, with an example being meeting information from D1, to avoid repeated retrieval of the same information.

B2 then connects to the meeting hosted on server 312 at B1. B2 connects to the meeting as a client on behalf of user 2. Because B2 has connected as a client (on behalf of all users locally connected to it), only single copies of video and data streams to and from users 1 and 2 will be exchanged over dedicated link 317, regardless of how many local users are participating in the meeting 123J@1.1.1.1. If, for example, at a later time user 3 locally connected to conference server 412 joins the meeting 123J@1.1.1.1, no additional video and audio data streams from user 1 will be communicated over link 317 to B2. Instead, B2 will continue to receive only a single copy of each user 1 data stream and will communicate copies to each of users 2 and 3. Again, this achieves significant stability, bandwidth and other resource savings as compared to the prior art.

FIG. 11 is also useful to further illustrate methods, systems and program products of the invention in which more than two conference servers are federated and connected with a dedicated link for efficient communications. In particular, FIG. 11 illustrates conference server 712 which is federated and directly linked to both conference servers 312 and 412.

Assume that user 2 desires to add user 4 to the videoconference 123J@1.1.1.1. Because presence element P2 running on conference server 412 is in communication with presence element P3 running on conference server 712, user 2 has data showing that user 4 is currently connected to federated server 712 and available for conferencing. User 2 invites user 4 to participate in the meeting via P2 which communicates the invitation using link 417 to presence engine P3 running on federated server 712.

User 4 receives the invitation to join meeting 123J@1.1.1.1 communicated via P3 and accepts the invitation. User 4 requests meeting manager M3 running on its local server to join meeting 123J@1.1.1.1. M3 recognizes that the 1.1.1.1 extension is not local, that it corresponds to remote federated server 312, and requests meeting details for the meeting from meeting manager M1 using dedicated link 717. Meeting manager M1 running on conference server 312 retrieves the information from database D1 and communicates it to M3. M3 then communicates the information to user 4.

User 4 next sends a request to the bridge B3 running on its local server 712 to join the meeting 123J@1.1.1.1. B3 requests meeting information from local meeting manager M3, and M3 once again recognizes this address as corresponding to a meeting hosted on server 312 and requests meeting information from meeting manager M1 using dedicated link 717. M1 once again retrieves required information from D1 and communicates it to M2 over dedicated link 717. B3 then connects to the meeting hosted on server 312 at B1 using dedicated link 717 to communicate. B3 connects to the meeting as a client on behalf of user 4. In this manner, conference server 712 communicated with federated server 412 for presence information, but otherwise communicated with server 312 to join and participate in the videoconference.

During the videoconference, conference server 712 communicates audio and video data streams originating from user 4 over the dedicated link 717 to server 312. Likewise, server 312 communicates video and audio data streams from users 1, 2 and 3 to federated conference server 712 over the dedicated link 717. Users 1-4 therefore enjoy real-time two way audio and video communication between one another, where each can see and hear all others of the users simultaneously.

In another efficiency enhancing aspect of some invention embodiments, the conference server 312 that is hosting the video conference will monitor use of the data streams it is communicating. If an indication is received or detected that a user is no longer using one particular data stream, the server 312 will terminate communication of that stream. As an example, user 4 is receiving three video data streams—one from each of users 1-3. User 4 may initially view all three data streams, with one way to do so being by having three individual windows open on a monitor, one each of the windows showing one each of the video streams. At some point during the video conference user 4 may close a window and no longer view one of the video streams. Conference server 712 may detect this and communicate a message to federated server 312. Server 312 may then terminate communication of the particular video data stream that user 4 is no longer viewing to server 712 to reduce resource consumption.

The three servers 312, 412 and 712 of FIG. 10, which may represent three individual data centers that are geographically remote from one another, appear to users 1-4 as a single ubiquitous videoconference network through practice of a system, method or program product of the invention. Users 1-4 can seamlessly communicate with each other regardless of what geographically remote server they are locally attached to, with meeting join, data communication, and other aspects of videoconferences carried out in a highly efficient manner. Solutions of the present invention as illustrated by FIG. 10 are highly scalable, with additional remote conference servers able to be added for further expansion of the videoconference virtual network.

Although the example of FIG. 11 (as well as several others herein) has been illustrated with respect to communication of streaming video and audio data during videoconferences, embodiments of the present invention are not limited to practice with streaming video. Other data may be communicated during videoconferences using methods, systems and program products of the invention. Some of this data may not be streaming. As an example, in some embodiments the user presence data shared between federated servers may not be streaming data, but may instead be data that is sent on a repeated but intermittent basis. Or, an initial set of presence data may be sent at some point with updates (additions, deletions, other changes) communicated on various intervals or as necessary. Other non-streaming data includes application data. A shared whiteboard application, for example, may be provided with data communicated to render the whiteboard only when one user makes changes to it. Another example is a chat application where users in a videoconference can communicate text based messages to select of other conference participants during the conference.

Figure 12:
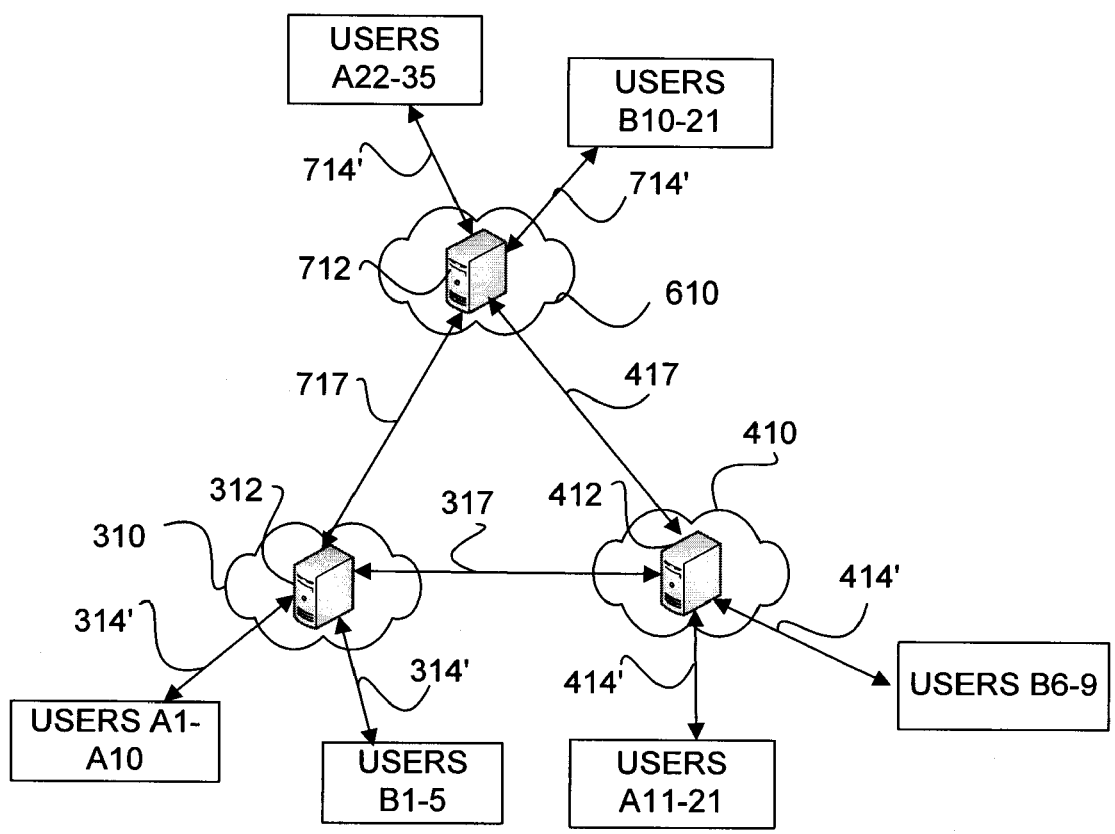
FIG. 12 is a schematic of a network useful to illustrate an additional invention embodiment.

It will further be appreciated that although examples have been illustrated herein in which federated conference servers are supporting one videoconference at a time, some or all federated conference servers may be supporting multiple videoconferences simultaneously. FIG. 12 is useful to illustrate an example. FIG. 12 shows federated conference servers 312, 412 and 712 that are connected to one another using high bandwidth communications links 317, 417 and 717. The conference servers and other elements of FIG. 12 may be considered to be generally consistent with like numbered elements of FIGS. 9 and 11.

In the schematic of FIG. 12, however, two simultaneous video conferences are being supported by federated conference servers 312, 412 and 712. One videoconference includes all of users A1-10 (locally connected to conference server 312), users A11-21 (locally connected to conference server 412) and A22-35 (locally connected to conference server 712). During this "A" videoconference, each of the 35 users can share two way real time streaming audio and video data with each other. Any of the users may choose to watch any one or more, including all of, the 34 video data streams originating from other conference users. All video and audio data communications are carried out using dedicated links 317, 417 and 717.

At the same time (or at least a partially overlapping time) as the "A" videoconference is being carried out, a second "B" videoconference is being supported by the same conference servers 312, 412 and 712. This second videoconference includes users B1-5 (locally connected to conference server 312), users B6-9 (locally connected to conference server 412) and users B10-21 (locally connected to conference server 712). Note that although users have been illustrated collectively in FIG. 12 and as connected to the local conference servers with only a single link 314', 414' and 714', this has been done for convenience of illustration only. It will be understood that each user is an individual user that is separate from other users and that is connected to the local server by an individual communications link. A "prime" designation has been used with element numbers to draw attention to this.

Those knowledgeable in the art will appreciate the broad scope of the present invention as claimed below and that the representative collaboration event and video conference system, method and program product examples discussed herein are illustrative only. It will further be appreciated that many variations are possible within the scope of the invention as claimed herein below. The sequence of steps and arrangement of hierarchical levels of the example embodiments illustrated herein and in corresponding flowcharts, for example, could easily be altered. Also, some steps, parameters, and other elements may be omitted and others substituted. Equivalents to the steps and elements recited will be apparent to those knowledgeable in the art. Variable, file, level, set, and other element names have been used herein for convenience only, and these names should not be interpreted in a manner that unduly limits the invention.

What is claimed is:

1. A videoconference system in which multiple users communicate video and audio data to one another over a data network, the system comprising:

a first conference server linking a plurality of first users to one another to allow each of the plurality of first users to communicate at least one video data stream and at least one audio data stream to others of the first users whereby the first users are in real-time two way audio and video communication with one another;

a second conference server linking a plurality of second users to one another to allow each of the plurality of second users to communicate at least one video data stream and at least one audio data stream to others of the second users whereby the second users are in real-time two way audio and video communication with one another;

a high bandwidth communications link connecting the first conference server to the second conference server that exists before, during and after individual videoconferences between the first and second conference servers, the first conference server configured to communicate a first video data stream originating from at least one of the first users to the remote second conference server over the high bandwidth communications link, the second conference server configured to receive the first video data stream and to communicate it to at least one of the second users;

wherein the first conference server is configured to communicate only a single version of a video data stream to the second conference server; and, wherein the second conference server is configured to copy the single version of the first video data stream and communicate one copy to each of the plurality of second users that are locally connected to the second conference srver.

2. A videoconference system as defined by claim 1 wherein:

the second conference server is configured to copy the first video data stream and to communicate the copied first video data stream to each of a plurality of the second users that are locally connected to the second conference server;

the second conference server is configured to communicate second video data streams originating from each of the plurality of second users to the first conference server over the high bandwidth communications link; and, the first conference server is configured to receive the plurality of second video data streams and to communicate them to the at least one of the first users locally connected to the first conference server.

3. A videoconference system as defined claim 1 wherein:

the second conference server joins a video conference hosted by the first conference server over the high bandwidth link as a single client on behalf of the plurality of second users; and, wherein the first and second conference servers communicate video data streams in unicast.

4. A videoconference system as defined by claim 1 wherein:

the first conference server is configured to communicate presence data to the second conference server over the high bandwidth link, the presence data indicating which of the first users are currently available for participating in a videoconference; and, the second conference server is configured to communicate presence data to the first conference server over the high bandwidth link indicating which of the second users are available for videoconferencing.

5. A videoconference system as defined by claim 4 wherein:

the second conference server communicates the first user presence data to each of the second users, the first conference server is configured to communicate the second user presence data to each of the first users so that each of the first and second users have current user presence data for all of the first and second users indicating which are available for participating in a videoconference; and, the first and second conference servers communicate the user presence data before, during and after videoconferences and at a rate that ensures the presence data is current.

6. A videoconference system as defined by claim 4 wherein:

the high bandwidth communications link is a permanent and dedicated communications link established between the first and second conference servers for the purpose of carrying data related to videoconferences; and, the second conference server is geographically remote from the first conference server.

7. A videoconference system as defined by claim 1 wherein:

each of the first and second conference servers include a presence element that collects presence data for locally connected users indicating which are available for participating in a videoconference and wherein each of the first and second conference servers share presence data with one another over the high bandwidth communications link; and, the plurality of first users and the plurality of second users participate in a video conference with one another, the first and second conference servers configured to communicate only a single version of each video data stream and to copy each single version as necessary for communicating on to each of the individual first and second users.

8. A videoconference system as defined by claim 1 wherein the high bandwidth communications link is a first high bandwidth communications link, and further comprising:

a third conference server with at least one locally connected third user;

a second high bandwidth link connecting the third conference server to the first conference server; and, a third high bandwidth link connecting the third conference server to the second conference server;

the third conference server configured to communicate user presence data regarding availability of the third user for conferencing to the first conference server over the second high bandwidth link and to receive user presence data from the first conference server regarding availability of the plurality of first users for conferencing; and, the third conference server configured to communicate user presence data regarding availability of the third user for conferencing to the second conference server over the third high bandwidth link and to receive user presence data from the second conference server regarding availability of the plurality of second users for conferencing.

9. A videoconference system as defined by claim 8 wherein:

the plurality of first users locally connected to the first conference server participate in a videoconference with the plurality of second users locally connected to the second conference server and with the at least one third user locally connected to the third conference server, the videoconference hosted on the first conference server, each of the plurality of first users transmitting a video data stream to each of the plurality of second users, each of the second users communicating a video data stream to each of the first users, the first and second conference servers communicating only a single copy of each video data stream over the first high bandwidth communications link and copying it as necessary for distributing to locally connected users;

the third conference server communicates a third video data stream from the at least a third user to the first conference server over the second high bandwidth communications link, the first conference server distributing copies of the third video data stream to each of the plurality of first users; and, the first conference server communicates a single copy of the third video data stream to the second conference server over the first high bandwidth communications link, the second conference server distributing a copy of the third video data stream to each of the plurality of second users.

10. A videoconference system as defined by claim 1 wherein the first and second conference servers are configured to recognize videoconference pass keys received from the first and second users, the videoconference pass keys including at least two data fields, one of the fields identifying one of the first or second conference servers.

11. A videoconference system as defined by claim 1 wherein:
the first and second conference servers are federated; and,
the first users, the first conference server, the second users, and the second conference server all communicate the video data streams in unicast.

12. A computer program product for managing streaming data communication between different servers during a videoconference, the program product comprising executable instructions stored on a non-transitory tangible medium, the instructions when executed causing first and second video conference servers that are geographically remote from one another to perform steps comprising:
the first conference server to receive a request from a locally connected first user to participate in a videoconference with at least second and third users that are connected to a remote server that is linked to the first server by a high bandwidth communications link that already exists;
the second conference server to connect to the first conference server using the high bandwidth communications link as a client on behalf of the second and third users;
the first conference server to receive a first user video data stream from the first user and to communicate it to the second conference server using the high bandwidth communications link;
the second conference server to receive the first user video data stream, to copy it, and to communicate one copy of the first user video data stream to each of the second and third users;
the second conference server to receive a second user video data stream from the second user and to communicate it to the first conference server using the high bandwidth link;
the second conference server to receive a third user video data stream from the third user and to communicate it to the first conference server using the high bandwidth link;
the first conference server to receive each of the second user video data stream and the third user video data stream from the second conference server and to communicate both of the second and third user video data streams to the first user, wherein each of the first, second and third users are in real-time streaming video communication with one another;
the program instructions when executed further cause the first conference server to receive a second user identifier from the first user that includes at least two fields, one of the two fields identifying the second conference server; and
the high bandwidth communications link exists before, during and after individual videoconferences.

13. A computer program product as defined by claim 12, wherein the program instructions when executed further cause the first and second conference servers to perform steps comprising causing the first conference server to copy each of the second and third user video data streams and to distribute copies of each of the second and third video data streams to each of a plurality of first users that are locally connected to the first conference server.

14. A computer program product as defined by claim 12 wherein:
the first conference server and its locally connected users are located in a first city and a first state, wherein the second conference server and its locally connected users are located in a second city and a second state that are different than the first city and first state; and,
the program instructions cause the first conference server and the second conference server to communicate video streams from users in unicast.

15. A computer program product as defined by claim 12 wherein the program instructions cause the first conference server to report locally connected user presence data to the second conference server before, during and after videoconferences over the high bandwidth communications link and cause the second conference server to report locally connected user presence data to the first conference server before, during and after videoconferences over the high bandwidth communications link such that all users locally connected to each of the first and second conference servers have current presence data that describes the availability of users locally connected to each of the first and second conference servers for conferencing.

16. A method for communicating streaming video data during a videoconference between users that are locally connected to different conference servers, the method comprising the steps of:
a first camera at a first user to generate video data, a first computer at the first user to transform the video data from the camera into a first video data stream and to communicate the video data stream to a first conference server;
the first conference server to communicate a single copy of the first video data stream to a remote second conference server in unicast using a high bandwidth link that exists between the first and second conference servers before during and after individual video conference and that is used for multiple different videoconferences between the first and second conference servers;
the remote second conference server to receive the single copy of the first video data stream and communicate in unicast one copy of the first video data stream to each of a plurality of locally connected second users; and,
the first conference server to repeatedly report presence data to the second conference server before, during and after individual videoconferences, the reported presence data indicating which first users are locally connected to the first conference server and available for conferencing, and the second conference server to communicate the presence data to locally connected second users whereby the locally connected second users have a current list of first users that are available for conferencing.

17. A method for communicating streaming video data during a videoconference as defined by claim 16 and further including the steps of the one or more of the first and second conference servers monitoring use of the first user video data stream by the second users locally connected to the second conference server, and to terminate communication of the first video data stream when it is determined that the second users are no longer using the first video data stream.

18. A method for communicating streaming video data during a videoconference as defined by claim 16 and further including the steps of a third conference server connecting to the first conference server as a client on behalf of a plurality of users locally connected to the third conference server, the first conference server communicating a single copy of the first video data stream to the third conference server and the third conference server communicating copies of the first video data stream to each of the plurality of users locally connected to the third conference server in unicast, and the third conference server sharing user presence data with each of the first and second conference servers whereby the plurality of users locally connected to the third conference server have a current list of all users locally connected to each of the first, second and third conference servers and available for conferencing with in a videoconference.

* * * * *